United States Patent
Ebihara et al.

[11] Patent Number: 5,990,995
[45] Date of Patent: Nov. 23, 1999

[54] REFLECTION TYPE LIQUID CRYSTAL DISPLAY DEVICE FOR CONVERTING INCIDENT LIGHT INTO ELECTRIC POWER

[75] Inventors: Teruo Ebihara; Osamu Yamazaki; Shunichi Motte; Shigeru Senbonmatsu; Kaori Taniguchi; Naotoshi Shino; Shuhei Yamamoto; Hiroshi Sakama; Masafumi Hoshino; Takakazu Fukuchi, all of Chiba, Japan

[73] Assignee: Seiko Instruments Inc., Japan

[21] Appl. No.: 08/878,212

[22] Filed: Jun. 18, 1997

[51] Int. Cl.$^6$ .................... G02F 1/1335; G02F 1/1331
[52] U.S. Cl. .................... 349/113; 349/114; 349/86
[58] Field of Search .................... 349/113, 114, 349/86

[56] References Cited

U.S. PATENT DOCUMENTS

| | | | |
|---|---|---|---|
| 5,493,430 | 2/1996 | Lu et al. | 359/68 |
| 5,680,188 | 10/1997 | Yoshida et al. | 349/113 |
| 5,729,313 | 3/1998 | Mitsui | 349/106 |

FOREIGN PATENT DOCUMENTS

| | | |
|---|---|---|
| 749030A1 | 12/1996 | European Pat. Off. . |
| WO9410668 | 5/1994 | WIPO . |
| WO9512826 | 5/1995 | WIPO . |
| WO9706464 | 2/1997 | WIPO . |

OTHER PUBLICATIONS

Patent Abstracts of Japan, vol. 095, No. 006 Jul. 31, 1995.
Patent Abstracts of Japan, vol. 098, No. 007 Mar. 31, 1998.
Patent Abstracts of Japan, vol. 009, No. 315 (E–365) Dec. 11, 1985.

*Primary Examiner*—William L. Sikes
*Assistant Examiner*—Heidi L. Eisenhut
*Attorney, Agent, or Firm*—Adams & Wilks

[57] ABSTRACT

A reflection type liquid crystal display device comprises a pair of substrates having electrodes, a light scattering type liquid crystal layer interposed between the substrates, a reflection layer disposed over a rear surface of the light scattering type liquid crystal layer, and a light absorbing layer disposed over a rear surface of the reflection layer for absorbing a light passed through the reflection layer. The light scattering type liquid crystal layer changes into a scattering state or a transparent state in accordance with a change in a voltage level between the electrodes, and transmits 60% or more of incident light irrespective of the change in the voltage level between the electrodes. The reflection layer has a reflectivity within a range of 10 to 50% for reflecting a forward scattered light passed through the light scattering type liquid crystal layer.

13 Claims, 17 Drawing Sheets

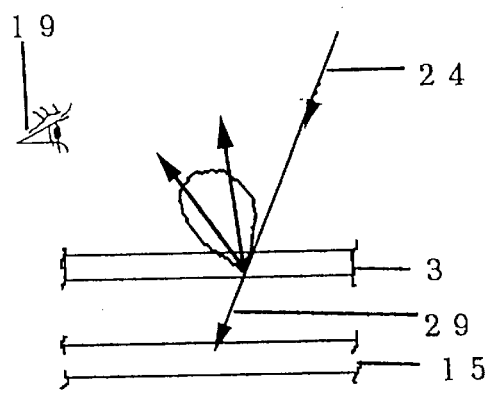
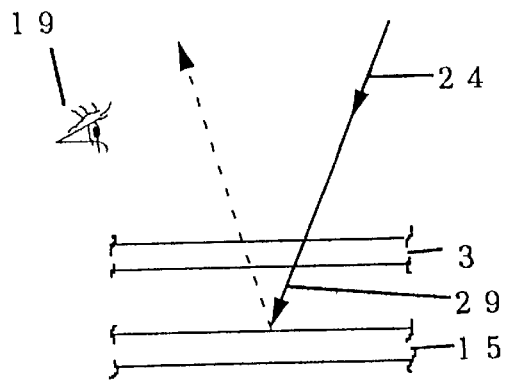
FIG. 13A
FIG. 13B
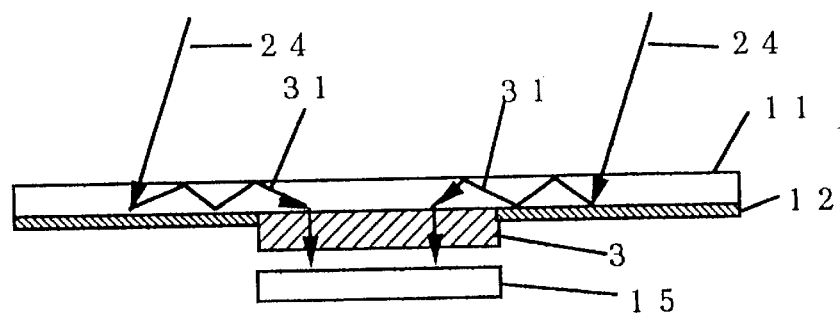
FIG. 14

FIG. 22

| applying drive voltage | cell gap (μm) | | |
|---|---|---|---|
| | 6 | 12 | 18 |
| transmittance only the light control layer | 0V | 80% | 75% | 50% |
| | 5V | 90% | 90% | 89% |
| transmittance including the reflection layer | 0V | 40% | 50% | 48% |
| | 5V | 45% | 63% | 85% |

FIG. 23

| | applying drive voltage | condition (d) | condition (e) |
|---|---|---|---|
| transmittance only the light control layer | 0V | 80% | 75% |
| | 3V | 55% | 50% |
| transmittance including the diffuse layer | 0V | 24% | 53% |
| | 3V | 17% | 35% |

FIG. 24

| | applying drive voltage | condition (d) |
|---|---|---|
| transmittance only the light control layer | 0V | 70% |
| | 15V | 90% |

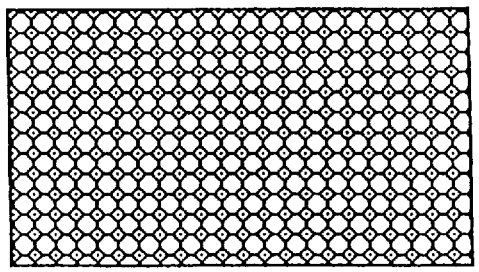
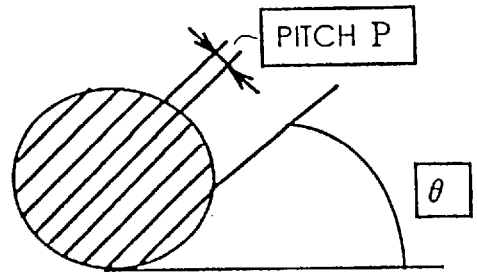
FIG. 30A FIG. 30B
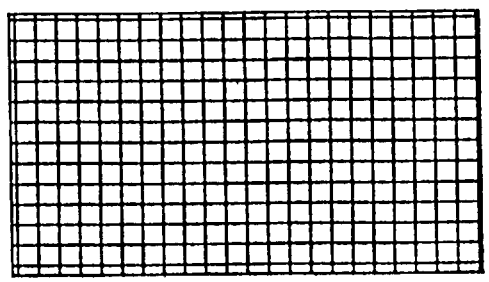
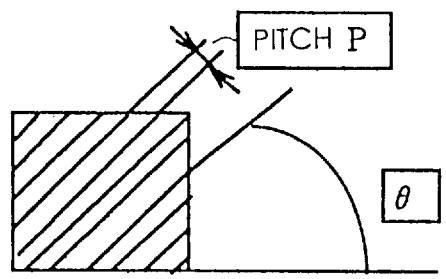
FIG. 31A FIG. 31B

REFLECTION TYPE LIQUID CRYSTAL DISPLAY DEVICE FOR CONVERTING INCIDENT LIGHT INTO ELECTRIC POWER

BACKGROUND OF THE INVENTION

The present invention relates to a reflection type liquid crystal display device to be used in ornaments, clocks, electronic calculators, radios, small-sized mobile devices or displays. More particularly, the present invention relates to an especially bright reflection type liquid crystal display device which can convert an incident light partially into an electric power.

In the prior art, there is a display method which makes use of not a polarizing plate, but the light scattering properties of a liquid crystal, as represented by the phase transition mode or the polymer scattering mode. This light scattering mode causes no absorption loss of light by the polarizing plate but can make effective use of the light to make a bright display.

As the polymer scattering mode, for example, here is known a structure in which liquid crystal droplets are arranged in polymers, as disclosed in U.S. Pat. No. 4,435,047 or U.S. Pat. No. 4,688,900. However, these techniques adopt the droplet structure so that they fail to make the low-voltage drive and the sufficient scattering intensity compatible and the low-voltage drive and the sufficient transparency compatible. There is also known a structure in which the liquid crystals form a continuous layer having polymer materials distributed in a three-dimensional network structure, as disclosed in Japanese Patent Laid-Open No. 198725/1989.

FIG. 6 shows an example of the prior art, in which the black-and-white display is falsely made by a liquid crystal layer 3 using those light scattering mode.

As shown in FIG. 6A, the liquid crystal layer 3 is sandwiched between electrodes 2a and 2b on glass substrates 1a and 1b, and a reflection layer 4 is mounted on a substrate 7 below the liquid crystal layer 3. The reflection layer 4 is made of a metallic film of aluminum or silver having a high surface reflectivity. In this conventional example, when no voltage is applied to the liquid crystal layer 3 (that is, when OFF), the forward scatter in the liquid crystal layer 3 is reflected backward by the reflection layer 4 so that the white brightness increases to look white (or opaque) When the voltage is applied to the liquid crystal layer 3 (that is, when ON), the light scattering action in the liquid crystal layer 3 disappears so that the display is transparent to look falsely black. According to this method, the reflection layer has a mirror surface of high reflectivity so that the regularly reflected light dazzles the eyes of the observer, when the voltage is applied (or when ON). Thus, there arises a problem that the contrast between ON and OFF is degraded.

For solving the dazzling problem, on the other hand, it is possible to conceive a structure in which an absorption layer is provided in place of the reflection layer 4, as shown in FIG. 6B. Below the liquid crystal layer 3 sandwiched between the transparent electrodes 2a and 2b on the glass substrates 1a and 1b, there is mounted a light absorbing layer 5 on the substrate 7. The light absorbing layer 5 contains carbon or the like. According to this conventional example, when the voltage is applied to the liquid crystal layer 3 (or when ON), the light scattering action in the liquid crystal layer 3 disappears to establish a transparent display. As a result, the incident light is absorbed by the light absorbing layer to make a black appearance so that this sufficient black compensates the defect of the structure in FIG. 6A. When OFF, however, the backward scatter of the incident light in the liquid crystal layer 3 is too insufficient to keep the white brightness so that the white ground is dark. This also causes the problem that the contrast between ON and OFF is degraded.

For raising the white brightness, on the other hand, it is also possible to conceive a method by which the liquid crystal layer is thickened to increase the backward scatter in a polymer dispersed liquid crystal thereby to reduce the transmittance. However, this thickened polymer dispersed liquid crystal causes other problems that the responsibility is deteriorated and that the drive voltage is raised. This fails to satisfy the serious restricting condition of the low-voltage drive, as required for the use in clocks or mobile devices.

As means for coloring the light scattering mode, on the other hand, there is proposed a method by which a light absorbing plate for emitting a specific color is arranged on the light absorbing layer 5 in FIG. 6B. According to this method, however, the light absorbing plate at the back is seen through at the scattering time, too. This is not substantially different from the color of the light absorbing plate, as appearing at the transparent time, so that the visibility is poor. Thus, the method is defective in that it cannot make a full-color display by spatially mixing the basic color units of red, blue and green.

Here will be described an example of the construction of a small-sized mobile electronic device in which are packaged a reflection type LCD using the polarization plate of the prior art and a photovolatic element. FIG. 9 shows an appearance of a card-type electronic calculator. In FIG. 9, reference numeral 23 designates a display portion having the conventional reflection type LCD packaged therein; numeral 20 shows a solar cell portion; numeral 21 shows an input key portion; and numeral 22 shows a case. On the other hand, FIG. 10 shows an appearance of a digital wrist watch. In FIG. 10, numeral 23 designates a display portion having the conventional reflection type LCD packaged therein; numeral 20 shows a solar cell portion; and numeral 22 shows a case.

The following defects accompany the constructions of the small-sized mobile electronic devices in which are packaged the reflection type LCD using the conventional polarization plate and the photovolatic element. In the case of the card type electronic calculator of FIG. 9, for example, if the area of the display portion is enlarged to read the display easily, the area to be given to the solar cell portion is reduced to make the electric power insufficient for operating the card type electronic calculator. If the area of the key input portion is likewise enlarged to facilitate the inputting operation, the area to be given to the solar cell portion is reduced to make the electric power insufficient for operating the card type electronic calculator. Thus, it is preferable for the design for sufficing the intrinsic function of the card type electronic calculator that the area of the solar cell portion is as small as possible.

In the case of the digital wrist watch of FIG. 10, on the other hand, if the area of the display portion is enlarged to facilitate the reading of the display, the area to be given to the solar cell portion is reduced so that a sufficient electric power cannot be achieved for operating the digital wrist watch. Moreover, the presence of the large and blackish solar cell in the surface panel of the digital wrist watch makes the design rustic so that the fashion or an important factor of the watch is so poor as to degrade its commercial value.

In order to solve this problem, there is conceivable a method by which the reflection type LCD and the solar cell are overlapped. This method can be exemplified by mounting the solar cell on the back of the reflection type LCD. In the TN or STN mode having the construction of FIG. 8, however, the aluminum plate is used as the reflection plate but can hardly be expected for use in the transparent mode. When the reflection plate is made semitransparent, it is the current practice to vacuum-evaporate the aluminum thinly. Because of the absorption of aluminum, however, the transmittance is about 20% at most. As a result, the light, as could pass through the reflection type LCD and go into the solar cell at the back, is reduced to as low as 5% of the value for the absence of the reflection type LCD. On the other hand, the brightness of the reflection type LCD is about one half of that of the usual case where the aluminum reflection plate is used. As a result, the brightness of the reflection type LCD is so dark as to provide a poorly visible display. Moreover, the electric power, as generated by the solar cell, is as low as 5% of the value for the absence of the reflection type LCD so that it cannot operate the small-sized mobile electronic device normally.

In the pseudo black-and-white display reflection type liquid crystal display device using the light scattering type liquid crystal of the prior art, as described hereinbefore, when a reflection plate of high reflectivity is used, it dazzles the observer's eyes with the regular reflection, when the voltage is applied (ON). As a result, there arises a problem that the black display is hard to make so that the visibility is too poor to give aclearcontrast. When the reflectionplateis replacedbythelight absorbing layer so as to make the black display, on the other hand, the white brightness by the backward scatter cannot be achieved, when no voltage is applied (OFF). This raises another problem that the display is too dark white to give a clear contrast. In addition, there exists no means for making the sufficient contrast and brightness compatible for the color display.

Moreover, it is difficult to provide a reflection type LCD of high power generating efficiency, which is freed from reductions in the brightness and visibility of the reflection type LCD using the conventional polarization plate even when the reflection type LCD and the solar cell are overlapped.

SUMMARY OF THE INVENTION

It is, therefore, an object of the present invention to provide a display panel which can make a highly bright and visible black-and-white display.

According to the present invention, there is provided a reflection type liquid crystal display device comprising: a liquid crystal layer sandwiched between at least two electrodes formed between a pair of substrates; a reflection layer disposed at the back of the liquid crystal layer; and a light absorbing layer disposed at the back of the reflection layer, wherein the liquid crystal layer changes into a scattering state or a transparent state in accordance with the change in the voltage level between the electrodes, and transmits 60% or more of incident light irrespective of the change in the voltage level, and wherein the reflection layer has a reflectivity within a range of 10 to 50%.

The reflection layer is made of a dielectric multi-layered film or a metallic film so that its reflectivity may be within a range of 10 to 50%.

The reflection layer and the absorption layer can be integrated, or one of the electrodes can act as the reflection layer.

The liquid crystal layer changes into the scattering state or the transparent state in accordance with the change in the voltage level between the electrodes, and the reflection layer reflects a specific color in the visible region.

The liquid crystal layer changes into the scattering state or the transparent state in accordance with the change in the voltage level between the electrodes, and the reflection layer is a hologram.

The liquid crystal layer changes into the scattered state or the transparent state in accordance with the change in the voltage level between the electrodes to transmit 50% or more of an incident light irrespective of the change in the voltage level. The reflection layer has a reflectivity of 5% to 50% while having little absorption in the visible region and transmits most of the lights in the remaining visible region and in the near-infrared region. The light absorbing layer is a solar cell.

Alternatively, the liquid crystal layer changes into the scattered state or the transparent state in accordance with the change in the voltage level between the electrodes to transmit 50% or more of an incident light irrespective of the change in the voltage level. The reflection layer has functions to reflect a specific color in the visible light and to transmit most of the lights in the remaining visible region and in the near-infrared region. The light absorbing layer is a solar cell.

Alternatively, the liquid crystal layer is characterized to change between the state exhibiting an absorption to a specific wavelength range in the visible region and a transparent or substantially transparent state in accordance with the change in the voltage level thereby to transmit 50% or more of an incident light. The reflection layer has functions to diffuse and reflect with little reflection and in a reflectivity of 20% to 70% within the visible region and to transmit most of the lights in the remaining visible region and in the near-infrared region. The light absorbing layer is a solar cell.

Alternatively, the liquid crystal layer is characterized to change between the state exhibiting the Bragg reflection to the specific wavelength range in the visible region and the transparent or substantially transparent state in accordance with the change in the voltage level, and to transmit 50% or more of an incident light. The reflection layer is eliminated. The light absorbing layer is a solar cell.

An optical guide plate is disposed at the incident side of the solar cell and contains a fluorescent substance.

BRIEF DESCRIPTION OF THE DRAWINGS

FIGS. 13A and 13B present schematic diagrams for explaining the principle of the present invention;

FIG. 14 is a schematic diagram for explaining the principle of the present invention;

FIG. 22 is a diagram tabulating one example of the transmittance measurement result of a liquid crystal display element according to the present invention;

FIG. 23 is a diagram tabulating one example of the transmittance measurement result of a liquid crystal display element according to the present invention;

FIG. 24 is a diagram tabulating one example of the transmittance measurement result of a liquid crystal display element according to the present invention;

FIGS. 30A and 30B present explanatory diagrams showing random dot holograms to be used in the present invention; and FIGS. 31A and 31B are explanatory diagrams showing random dot holograms to be used in the present invention.

DETAILED DESCRIPTION OF THE PREFERRED EMBODIMENTS

Figure 1:
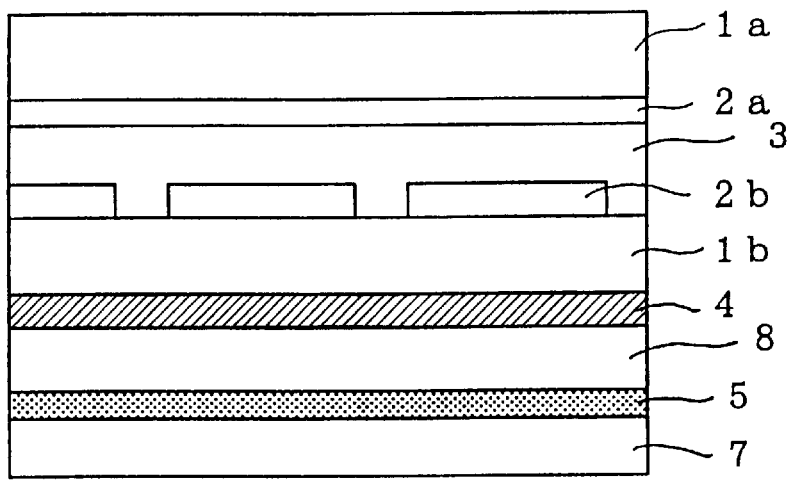
FIG. 1 is a section showing a construction of a reflection liquid crystal display device according to the present invention.

A basic construction of the reflection type liquid crystal display device using the light scattering liquid crystal of the present invention will be described with reference to FIG. 1. Of this basic construction, the functions and roles of a liquid crystal layer 3, a reflection layer 4 and a light absorbing layer 5 in the case of the pseudo black-and-white display will be described in the following. In the case of the so-called "paper white" display, in which the background color is made white by using the liquid crystal layer 3, only the background scattered light by the liquid crystal layer 3 is insufficient for a bright white color. For sufficiency, it is important how to effectively use the forward scattering (or reflected) light by the liquid crystal layer 3. A paper white bright background can be realized by using a reflecting plate for reflecting the forward scattered light efficiently.

In the case of a polymer network liquid crystal (N-LC), for example, the thickness of the liquid crystal layer 3 capable of retaining a practical, low drive voltage is about 6 $\mu$m to 15 $\mu$m, and the backward scattering percentage and the forward scattering percentage are 10% to 30% and 90% to 60%, respectively. The effective reflection of the forward scattered light determines the whiteness and brightness of the PN-LCD. As the gap enlarges, the opaqueness increases to raise the drive voltage undesirably. A transmittance of 60% or more is practical.

On the other hand, the reflectivity of the reflection layer 4 is raised to increase the forward scattered (or reflected) light to be reflected from the reflection layer 4. In this construction, while the light scattering liquid crystal is transparent, the regular reflection on the reflection layer surface is so intense that it is viewed as glaring. Therefore, the reflectivity of the reflection layer 4 is set to obtain the reflected light which is brightly white while suppressing the glare. For the transmittance of 60% or more of the scattering type liquid crystal, the white brightness can be retained with the reflection of the forward scattered light from the reflection layer 4 by setting the reflectivity of the reflection layer 4 within a range of 10 to 50%. By setting the reflectivity of the reflection layer 4 within the range of 10 to 50%, moreover, the glare by the regular reflection from the reflection layer 4 at the ON time is reduced so that the light having passed through the reflection layer 4 can be absorbed by the light absorbing layer 5 thereby to realize the black-and-white display.

With the basic construction of FIG. 1, here will be described the functions and roles of the liquid crystal layer 3, the reflection layer 4 and the light absorbing layer 5 for realizing the color display. The reflection layer 4 has a function to reflect a specific color of the visible light. This reflection layer 4 is exemplified by a dielectric multi-layer mirror or a mirror making use of the cholesteric selective reflection. These mirrors reflect the specific color efficiently and transmits its complementary color.

When the liquid crystal layer 3 is in the scattering state, the forward scattered light is colored to a specific color and reflected by that mirror. The forward scattered light in the complementary color, as having passed through the mirror, is absorbed by the light absorbing layer 5. This makes it possible to observe a bright diffuse light which is colored in the specific color. When the liquid crystal layer 3 is transparent, on the other hand, the incident light is separated by the mirror into a regularly reflected light and a transmitted rectilinear light. This transmitted rectilinear light is absorbed by the light absorbing layer 5. Thus, a black display is achieved if the gaze of an observer is turned from the regularly reflected light colored in the specific color.

One or more colors of the reflected light from the mirror may be arranged two-dimensionally. A multi-color display can be made in a striped or mosaic shape by combining two or more colors on a common plane for the individual pixels, for example, either in a pattern capable of displaying characters corresponding to electrodes or seven segments or in a patter capable of displaying a dot matrix.

The basic construction of FIG. 1 will be described in case the hologram is used in the reflection layer 4. The hologram to be used in the present invention is a recording medium for recording the amplitude and phase of light waves from an object in an interference fringe, so that the light waves from the original object are reconstructed with a reconstructing light. Even if the object is not real, the interference fringe, as formed by the light waves from the object, may be determined by a computer and recorded in the hologram. In the present embodiment, a three- or two-dimensional image is reconstructed with the light which has passed through the liquid crystal layer 3, as controlled in the optically transmitting state. On the other hand, the forward scattered light, as having passed through the liquid crystal layer 3 controlled in the scattering state, is seriously lowered in the interference. This makes it impossible to reconstruct the three- or two-dimensional image which is recorded in the hologram. The forward scattered light is reflected as the light, which is prepared by multiplying the hologram by the measured value of the spectral diffuse reflectivity measured by an integrating sphere, while the remainder being absorbed by the light absorbing layer 5.

By changing the spectral diffuse reflectivity of the hologram arbitrarily, moreover, the forward scattered light can be controlled to reconstruct and display a three- or two-dimensional image on the background in the specific color such as bright white or dark brown.

Here will be described the display effect of the case in which the recording image of the hologram layer is exemplified by a two-dimensional pattern, as illustrated in FIG. 30. A number of round dots are so formed that their diffraction directions and angles are set at random, as shown at FIGS. 30A–30B. In the direction of diffraction, the fringe direction θ of the hologram of FIG. 30 is designed at random. At the angle of diffraction, on the other hand, the fringe pitch P of the hologram is designed at random. A similar hologram may be formed in the gaps between the round dots. The type of hologram to be recorded may be exemplified by the transparent holography diffraction grating such as the grating image hologram or the grating hologram, or by the stereo-phase reflection hologram such as the Lippmann hologram. The grating image hologram may be blazed to improve the diffraction efficiency. The dots may be shaped rectangular, as shown at FIGS. 31A–31B.

The hologram layer may desirably reconstruct, when the liquid crystal layer is controlled in the optically transmitting state, a three- or two-dimensional image at a location apart from the regularly reflected image of the liquid crystal layer. This construction is desirable especially when the liquid crystal layer and the hologram layer are arranged substantially in parallel.

In the reflection type liquid crystal display device which is constructed to have a solar cell as the light absorbing layer 5, a portion of the light, as incident on the reflection type liquid crystal display device, has to be efficiently distributed and fed as one necessary for the power generation to the solar cell which is arranged at the back of the liquid crystal layer. It is also necessary that no drop occurs in both the display brightness and the visibility of the liquid crystal layer. The operation principle for the break-through the trade-off relation described above will be explained with reference to FIGS. 11 to 14 explaining the principle of the present invention.

As shown in FIG. 11, the reflection type liquid crystal display device is constructed to include: a liquid crystal layer 3 using the light scattering mode, in which the transmittance is 50% or more irrespective of the change in the voltage level between the electrodes; a reflection layer 4 disposed at the back of the liquid crystal layer 3 and having a function to have a reflectivity of 5% to 50% for a light in the visible region with little absorption and to transmit most of the remaining light in the visible region and a light in the near-infrared region; and a solar cell 15 disposed at the back of the reflection layer 4.

The reason why the transmittance of the liquid crystal layer 4 is set to 50% or more is to sufficiently retain the quantity of light to be distributed to the solar cell 15. For a transmittance of 50% or less, on the other hand, the liquid crystal layer 3 has to be thickened to raise the drive voltage and increase the power consumption of the liquid crystal layer 3. It is, therefore, desirable to set the transmittance of the liquid crystal layer 3 to 50% or more.

If the transmittance of the liquid crystal layer 3 is excessively high, on the other hand, a backward scattered light 27 decreases to lower the brightness of the liquid crystal layer 3. in this case, a forward scattered light 25 and a forward rectilinear light 26 are reflected on the reflection layer 4 to thereby to increase the brightness of the liquid crystal layer 3. Here, a reflectivity of 50% or more of the reflection layer 4 would cause disadvantages that the quantity of light to be distributed to the solar cell 15 at the back, and that the quantity of a regularly reflected light 28 from the reflection layer 4 while the liquid crystal layer 3 is transparent increases to deteriorate the visibility. Therefore, the reflection layer 4 is desired to have functions to absorb little light in the visible region and to have a reflectivity of 5% to 50% to thereby transmit most of the lights, as left unreflected, in the visible and infrared regions.

Figure 11A:
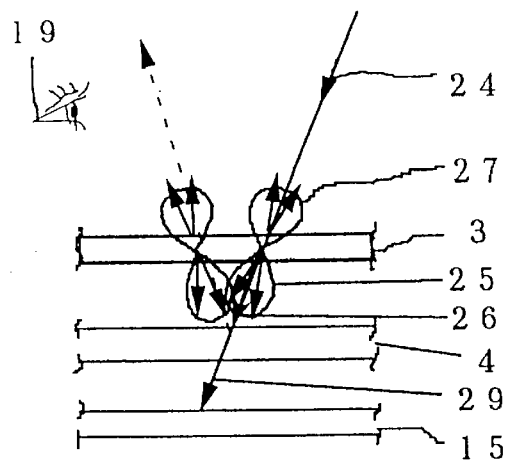
FIGS. 11A and 11B present schematic diagrams for explaining the principle of the present invention.
Figure 11B:
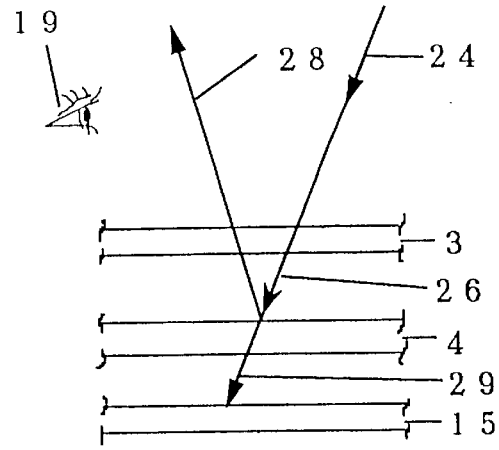

An incident white light 24 is modulated with a two-dimensional light of display information and is transmitted through the liquid crystal layer 4 until it enters the reflection layer 4. Here, the liquid crystal layer 3 takes the scattering state and the transparent state in accordance with the level of the applied voltage so that a scattered state portion, as indicated in FIG. 11A, and a transparent state portion, as indicated in FIG. 11B, are present according to the display information. In other words, the incident white light 24 goes, after having passed through the liquid crystal layer 3, into the reflection layer 4 while having the properties of two kinds of lights: the forward scattered light 25 having passed through the scattering state portion (A); and the forward rectilinear light 26 having passed through the transparent state portion (B).

The forward scattered light 25 having passed through the scattering state portion (FIG. 11A) is reflected in the scattered state by the reflection layer 4 so that it is further scattered by substantially the same region as that at the incident time. On the other hand, the forward rectilinear light 26 is also reflected by the reflection layer 4 and is scattered again in the scattering state portion. Thus, the scattered light, as synthesized of the scattered light of the reflected light of the forward scattered light 25 and the scattered light of the forward rectilinear light 26, and the backward scattered light 27 reach an observer 19 so that the scattered state in white color is observed. On the other hand, a transmitted light, as having passed through the reflection layer 4, of the forward rectilinear light 26 is absorbed by the solar cell 15 to contribute to the power generation.

On the other hand, the forward rectilinear light 26 having passed through the transparent state portion (FIG. 11B) is distributed by the reflection layer 4 into the regularly reflected light 28 and the transmitted light 29. The observer 19 is enabled to view the black display by turning the gaze from the regularly reflected light 28. The transmitted light 29 is absorbed by the solar cell 15 to contribute the power generation.

The liquid crystal layer is characterized to change into the scattered state or the transparent state in accordance with the change in the voltage level between the electrodes, and to have a function to transmit 50% or more of incident light irrespective of the change in the voltage level. The reflection layer is characterized to reflect the visible light in the specific color but to transmit most of the remaining lights in the visible region and in the infrared region. The light absorbing layer is characterized to have the solar cell.

As shown in FIG. 12, the reflection type liquid crystal display device is constructed to include: a liquid crystal layer 3 changing between the state, in which it exhibits absorption to a wavelength range in the visible light region, and a transparent state or a substantially transparent state according to the change in the voltage level between transparent electrodes, and having an average transmittance to lights in the visible region and in the infrared region; a diffuse layer 30 disposed at the back of the liquid crystal layer 3 and having functions to absorb little light in the visible region and to have a reflectivity of 20% to 70% thereby to transmit most of the lights, as left unreflected, in the visible region and in the infrared region; and a solar cell 15 disposed at the back of the diffuse layer 30.

The reason why the transmittance of the liquid crystal layer 3 is set to 50% or more is to sufficiently retain the quantity of light to be distributed to the solar cell 15. Therefore, the transmittance of 50% or more is desirable. The restriction of the absorption wavelength range of the liquid crystal layer 3 in the optically modulated state to a specific wavelength range will be reasoned in the following. If the absorption is made by the entirety of the visible range with the transmittance being set to 50% or more, the display has a seriously poor contrast. By increasing the absorption only in a partial wavelength of the visible region and by retaining the transmittance of 50% or more, therefore, the color difference between the colored state and the transparent state is enlarged to improve the contrast and the visibility. By setting the absorption in the wavelength range where the spectral sensitivity of the solar cell 15 is especially poor in the visible region, moreover, it is possible to prevent the power to be generated by the solar cell 15 from decreasing.

When the reflectivity of the diffuse layer 30 exceeds 70%, there arises a disadvantage that the quantity of light to be distributed to the solar cell 15 at the back is reduced. For a reflectivity of 20% or less, on the other hand, the efficiency of reflection of the optically modulated state at the liquid crystal layer 3 is deteriorated to lower the brightness and degrade the visibility. Moreover, the quantity of light to be distributed to the solar cell 15 at the back is reduced. Thus, the desired function is to have the reflectivity of 20% to 70% with little absorption in the visible region and to transmit most of the lights, as left unreflected, in the visible region and in the infrared region.

Figure 12A:
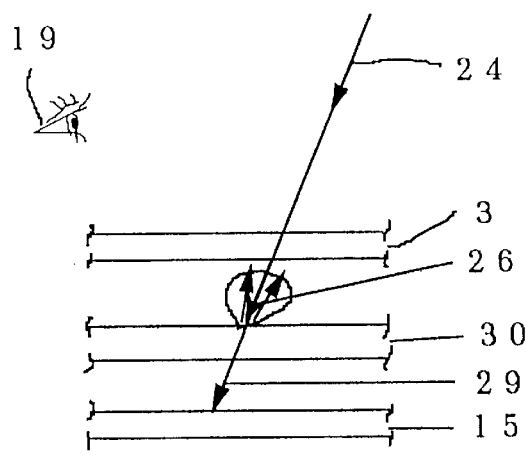
FIGS. 12A and 12B present schematic diagrams for explaining the principle of the present invention.
Figure 12B:
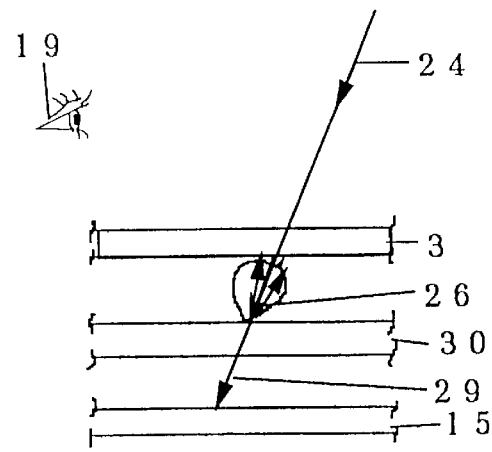

The incident white light 24 is two-dimensionally modulated with the display information and transmitted through the liquid crystal layer 3 until it goes into the diffuse layer 30. Here, the liquid crystal layer 3 is composed of the transparent state portion, as indicated in FIG. 12A, and the absorptive state portion, as indicated in FIG. 12B, according to the display information so that it may take a state exhibiting an absorption to the wavelength range in the specific visible region and a transparent state in accordance with the applied voltage level. In other words, after having passed through the liquid crystal layer 3, the incident white light 24 goes into the diffuse layer 30 while having the properties of two kinds of lights: the forward rectilinear light 26 having passed through the liquid crystal layer 3 in the transparent state portion (FIG. 12A); and the forward rectilinear light 26 having been colored while passing through the state (FIG. 12B) exhibiting the absorption.

The forward rectilinear light 26, as having passed through the transparent state portion indicated in FIG. 12A, is scattered by the diffuse layer 30 so that it is observed as the scattered while state by the observer. The transmitted light 29, as having passed through the diffuse layer 30, of a portion of the visible light and the near-infrared ray are absorbed by the solar cell 15 to contribute to the power generation.

On the other hand, the forward rectilinear light, as having been colored while passing through the absorptive state portion (FIG. 12B), is scattered by the diffuse layer 30 so that it is observed as the colored scattered state by the observer 19. The transmitted light 29 of the colored portion of the visible light and the near-infrared ray is absorbed by the solar cell 15 to contribute to the power generation.

In FIG. 13, the reflection type liquid crystal display device is characterized to change between the state, in which the Bragg reflection is exhibited within the wavelength range in the specific visible region, and the transparent or substantially transparent state in accordance with the change in the voltage level between the transparent electrodes. The reflection type liquid crystal display device is constructed to include a liquid crystal layer 3 having a transmittance of 50% or more, and a solar cell 15 disposed at the back of the liquid crystal layer 3.

The reason why the transmittance of the liquid crystal layer 3 is set to 50% or more is to prevent the quantity of light to be distributed to the solar cell 15 from decreasing. Therefore, the transmittance of 50% or more is desirable. The restriction of the Bragg reflection wavelength range of the liquid crystal layer 3 in the optically modulated state to a specific wavelength range will be reasoned in the following. If the Bragg reflection is made by the entirety of the visible range with the transmittance being set to 50% or more, the display has a seriously poor contrast. By increasing the Bragg reflection only in a partial wavelength of the visible region and by retaining the transmittance of 50% or more, therefore, the color difference between the colored state and the transparent state is enlarged to improve the contrast and the visibility. By setting the Bragg reflection in the wavelength range where the spectral sensitivity of the solar cell 15 is especially poor in the visible region, moreover, it is possible to prevent the power to be generated by the solar cell 15 from decreasing.

The incident white light 24 is two-dimensionally modulated with the display information and transmitted through the liquid crystal layer 3 until it goes into the solar cell 15. Here, the liquid crystal layer 3 is composed of the state portion indicating the Bragg reflection, as indicated in FIG. 13A, and the transparent state portion, as indicated in FIG. 13B, according to the display information so that it may take a state exhibiting the Bragg reflection within the wavelength range in the specific visible region and a transparent state in accordance with the applied voltage level. As a result, the incident white light 24 is scattered at the Bragg reflecting exhibiting state portion (FIG. 13A) by the liquid crystal layer 3 so that it is observed as the colored scattered state by the observer 19. On the other hand, the transmitted light 29 is absorbed by the solar cell 15 to contribute to the power generation. The forward rectilinear light 26, as having passed through the transparent state portion (FIG. 13B), is absorbed by the solar cell 15 to contribute to the power generation so that it is observed as the black state by the observer 19.

In FIG. 14, the reflection type liquid crystal display device is equipped at the incident side of the solar cell 15 with an optical guide plate 11 containing a fluorescent substance, and is constructed by mounting the entirety on the reflection type liquid crystal display device having the construction shown in FIGS. 11, 12 or 13. A diffuse plate 12 is mounted on the back side, as being out of contact with the liquid crystal display device, of the optical guide plate 11.

The optical guide plate 11 is provided because it is possible to expect improvements in the display brightness and in the power generation by scattering the white light 24 incident on the optical guide plate 11 to transform its portion into a propagation light 31 and by condensing the propagation light 31 onto the liquid crystal layer 3 and the solar cell 15.

On the other hand, the fluorescent substance is contained in the optical guide plate because it is possible to expect an improvement in the power generation of the solar cell 15 by transforming the light in the wavelength band of the incident white light 24 and in the wavelength band, where the spectral sensitivity of the solar cell 15 is low, into a light having a wavelength of excellent spectral sensitivity.

The present invention will be specifically described in connection with its embodiments.

Embodiment 1

FIG. 1 is a schematic section showing a reflection type liquid crystal display device of the present invention.

Substrates 1a and 1b were made of smooth glass plates, but transparent polymer films may be used. Electrodes 2a and 2b were made of transparent electrodes of ITO films and patterned by the photolithography. Next, a cell was completed by scattering a spacer and applying a seal adhesive to make a cell gap of about 10 $\mu$m. This cell was exposed to an ultraviolet ray of about 50 mW/cm$^2$ while injecting a polymer network liquid crystal (PN-LC) kept at a constant temperature, to thereby form the liquid crystal layer 3. The relation between the transmittance and the cell gap was measured by using a light receiving element sized to measure the forward scattered light and the forward rectilinear light for no voltage application to the PN-LC. The results were about 82% for 6 $\mu$m, 75% for 12 $\mu$m, and 50% for 18 $\mu$m. For the larger gap, the transmittance becomes the smaller to increase the opaqueness, but the drive voltage is undesirably raised. For the present embodiment, the transmittance of 60% or more is practical. On the other hand, the material of the liquid crystal layer should not be limited to the polymer network liquid crystal but may be exemplified by a polymer dispersed liquid crystal of cholesteric nematic phase transition liquid crystal mode, polymer dispersed liquid crystal mode, dynamic scattered liquid crystal mode (DSM), thermal writing mode or reverse mode.

The reflection layer 4 was prepared by the sputtering apparatus from the aluminum the thickness of which was adjusted to have an optical reflectivity of 10 to 50% within the visible region. In the present embodiment, the reflection layer 4 was made to have a thickness of about 30 to 120 angstroms by the sputtering apparatus. The PN liquid crystal (i.e., PSI-1008 of DAINIPPON INK AND CHEMICAL, INCORPORATED) used in the present embodiment has a transmittance of about 78% for the thickness of about 9 $\mu$m of the liquid crystal layer. The thickness of the aluminum metallic film was adjusted to give an optical reflectivity of 10% to 50% in the visible region. The transparent electrodes 2a and 2b were made of the ITO or an oxide of the alloy which was filmed of indium and a small amount of tin by the sputtering method and the evaporation method. The resistance of the ITO can be freely adjusted, if necessary, but was set in the present embodiment to 20 $\Omega/\square$ for both the transparent electrodes 2a and 2b. A light absorbing layer 5 is placed below the reflection layer. The light absorbing layer 5 is made of a black background material containing carbon or the like for absorbing the visible light for the black-and-white display. In this case, the light absorbing layer 5 is seen white to the observer with the backward scattered light of the reflection layer 4 when no voltage is applied to the liquid crystal layer 3. When the voltage is applied to the liquid crystal layer 3, on the other hand, the light having passed through the reflection layer 4 is absorbed by the light absorbing layer so that it looks black.

For the reflection layer 4, not only the aluminum but also a material can be widely selected within the range of transmittance desired by the present invention. In addition to the aluminum, the present invention can employ a metal such as silver, nickel, chromium or palladium or their alloy or oxide. The alloy may be exemplified by the nichrome containing 80% of Ni and 20% of Cr. Two kinds of metallic films may be combined. For example, the reflection layer 4 was formed by forming a silver film of about 100 angstroms and then by forming an aluminum film of about 50 angstroms.

On the other hand, the reflection layer 4 may be formed of a dielectric multi-layered film, and the material, film thickness and layer number of the film of Si, SiO2, Ge, Y2O3, Al2O3, MgF2, Na3AlF6, TiO2, ZeO2, Ta2O5, ZnS, ZnSe or ZnTe are set according to the reflectivity and transmittance, as necessary.

The reflection layer 4 may be formed by combining a metallic film and a dielectric film. When the reflection layer 4 is formed exclusively of a metallic film, an absorption occurs in the reflection layer 4. This absorption can be reduced by using the dielectric film together. For example, a ZnS film is formed to have a thickness of about 600 angstroms, and an aluminum film is formed to have a thickness of about 40 angstroms thereby to form the reflection layer 4. A reversed structure, in which the dielectric film is formed after the aluminum film, may be sufficient for the characteristics demanded.

On the other hand, the reflection layer 4 may be formed of a semiconductor film of Si or Ge. In this modification, no absorption layer need be formed under conditions.

Figure 2A:
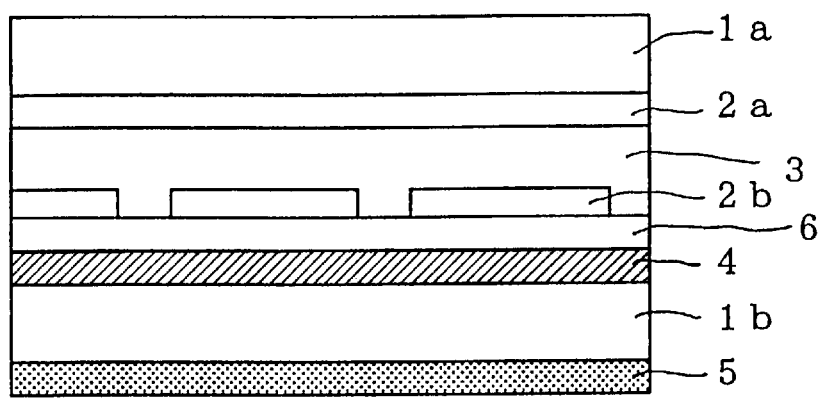
FIGS. 2A and 2B present sections showing a construction of a reflection type liquid crystal display device according to an embodiment of the present invention.
Figure 2B:
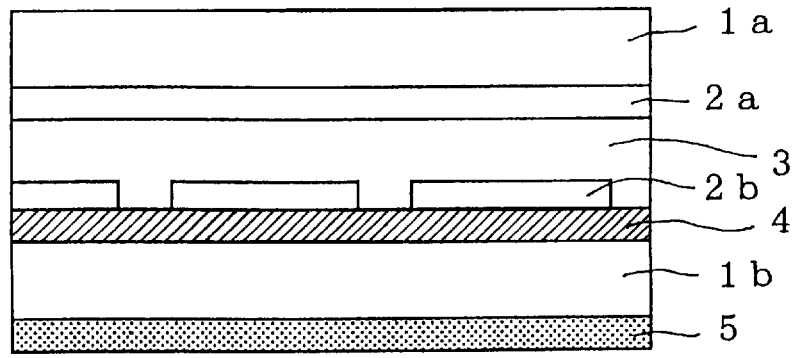

FIGS. 2A and 2B show a structure belonging to the present invention, in which the reflection layer 4 is formed on the inner face of the substrate 1b to prevent the double reflections. FIG. 2A shows an example in which the reflection layer 4 is made of a metallic film having electric conductivity. In this example, the electrode 2b is formed through an insulating film 6. This insulating film 6 is made of a material (e.g., V259-PA of Nippon Steel Chemical, Co., Ltd.) having a spectral transmittance of 90% or more and a high transparency in the visible region so as to prevent the spectral reflectivity of the reflection layer 4 from attenuating.

This insulating film 6 was given a thickness of about 2 μm by the spinner so that it might not be influenced by the metallic film of the reflection layer 4 when the voltage is applied to the display device. The remaining construction is identical to that of FIG. 1.

FIG. 2B is an example in which the reflection layer 4 is made of an insulating material such as a dielectric multi-layered film. In this example, the electrode 2b can be arranged directly on the reflection layer 4. The remaining construction is identical to that of FIG. 1. This example is advantageous in the process because it needs no insulating film.

Embodiment 2

Another embodiment will be specifically described with reference to FIG. 3.

Figure 3:
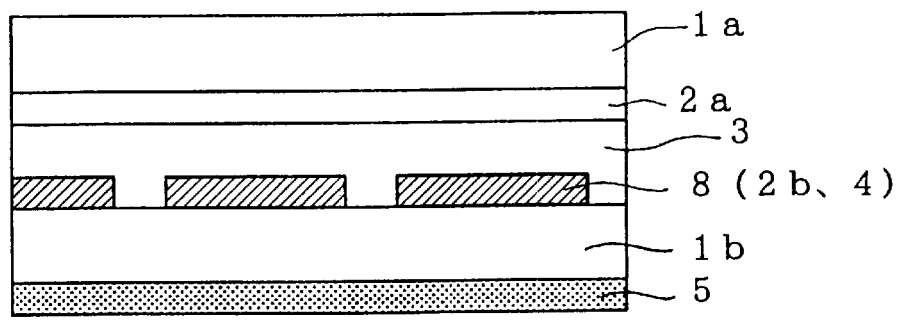
FIG. 3 is a section showing a construction of a reflection type liquid crystal display device of another embodiment of the present invention.

FIG. 3 is a schematic section showing a reflection type liquid crystal display device of the present invention. What is different from Embodiment 1 is to form the reflection layer on the inner face of the substrate and to form an electrode-reflector layer 8 acting as both one electrode 2b for driving the liquid crystal layer 3 and the reflection layer 4, so that the present embodiment has a reduced number of steps, an improved yield and a lowered cost. In this embodiment, at least the electrode-reflector layer 8 contains a conductive material. The substrates 1a and 1b were made of flat glass plates but may be made of transparent polymer films. The electrode-reflector layer 8 is formed over the substrate 1b. This electrode-reflector layer 8 may be made, as in Embodiment 1, of not only aluminum but also a metal of silver, nickel, chromium or palladium, or its alloy or its oxide. One example of this alloy is nichrome containing 80% of Ni and 20% of Cr. Moreover, two kinds of metallic films may be combined.

For example, a silver film was formed to a thickness of about 100 angstroms, and an aluminum film was then formed to a thickness of about 50 angstroms, thereby to form the electrode-reflector layer 8. This electrode-reflector layer 8 may be formed by combining a metallic film and a dielectric film. When the electrode-reflector layer 8 is formed exclusively of the metallic film, the absorption occurs in the electrode-reflector layer 8. This absorption can be reduced by using the dielectric film together. For example, the electrode-reflector layer 8 is formed by forming a ZnS film of about 600 angstroms and then an aluminum film of about 40 angstroms. A reverse structure, in which the dielectric film is formed after the aluminum film, may be sufficient for the characteristics demanded. The electrode-reflector layer 8 also acts as a drive electrode for the liquid crystal. In the case of a simple matrix type liquid crystal drive, for example, the common electrode or the segment electrode acts with the reflection layer to perform the operation of the electrode-reflector layer 8. In the case of the active type liquid crystal drive, on the other hand, the pixel electrode or the opposed electrode acts with the reflection layer to perform the operation of the electrode-reflector layer 8. The action with the opposed electrode is preferable for the numerical aperture or the like. The electrode-reflector layer 8 was prepared by adjusting the aluminum layer to such a thickness by the sputtering apparatus that the optical reflectivity in the visible region might be within a range of 10 to 50%.

In the present embodiment, the electrode-reflector layer 8 was formed to have a thickness of about 30 to 120 angstroms by the sputtering apparatus. In the present embodiment, the reflection layer 4 was made to have a thickness of about 30 to 120 angstroms by the sputtering apparatus. The liquid crystal layer 3 was made of the polymer network liquid crystal (PN-LC). The PN liquid crystal (i.e., PSI-1008 of DAINIPPON INK AND CHEMICAL, INCORPORATED) used in the present embodiment has a transmittance of about 78% for the thickness of about 9 μm of the liquid crystal layer. The thickness of the aluminum metallic film was adjusted to give an optical reflectivity of 10% to 50% in the visible region. The transparent electrode 2a was made of the ITO or an oxide of the alloy which was filmed of indium and a small amount of tin by the sputtering method and the evaporation method. The resistance of the ITO can be freely adjusted, if necessary, but was set in the present embodiment to 20 Ω/□ for the transparent electrode 2a. A light absorbing layer 5 is placed below the reflection layer. The light absorbing layer 5 is made of a black background material containing carbon or the like for absorbing the visible light for the black-and-white display. In this case, the light absorbing layer 5 is seen white to the observer with the backward scattered light of the electrode-reflector layer 8 when no voltage is applied to the liquid crystal layer 3. When the voltage is applied to the liquid crystal layer 3, on the other hand, the light having passed through the electrode-reflector layer 8 is absorbed by the light absorbing layer so that it looks black.

Another embodiment of the present invention will be specifically described with reference to FIG. 4.

Figure 4:
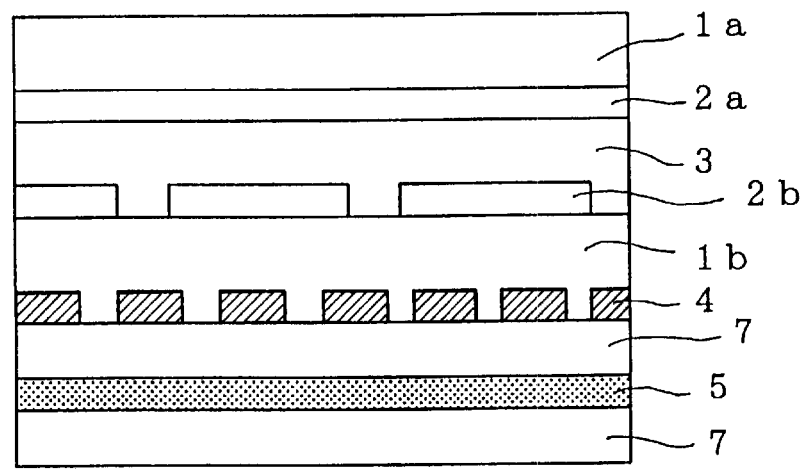
FIG. 4 is a section showing a construction of a reflection type liquid crystal display device of another embodiment of the present invention.

FIG. 4 is a schematic section of a reflection type liquid crystal display device of the present invention. The present embodiment is characterized in that fine pores are formed in the reflection layer so that the reflectivity of the reflection layer is controlled by the numerical aperture of the reflection layer. In this embodiment, the film thickness need not be reduced unlike Embodiment 1 even the material is a metallic film having a low transmittance. In order to attain a desired reflectivity, the pores may be formed in the reflection layer by converting the area from the reflectivity intrinsic to the material. The substrates 1a and 1b were made of flat glass plates but may be made of transparent polymer films. The electrodes 2a and 2b were made of transparent electrodes of the ITO film; the liquid crystal layer 3 was made of the polymer network liquid crystal (PN-LC); and the reflection layer 4 was made of aluminum by the sputtering apparatus.

In the present embodiment, the reflection layer 4 was formed to have about 1,500 angstroms by the sputtering apparatus. Since the aluminum has a reflectivity of about 90% to the visible light, the fine pores were formed by converting the area so that the reflection layer 4 might have a reflectivity of 10 to 50%. For example, pores of 5 to 50 μm were formed by the area conversion to achieve the above-specified transmittance. The PN liquid crystal (i.e., PSI-1008 of DAINIPPON INK AND CHEMICAL, INCORPORATED) used in the present embodiment has a transmittance of about 78% for the thickness of about 9 μm of the liquid crystal layer 3. The thickness of the aluminum metallic film was adjusted to give an optical reflectivity of 5% to 50% in the visible region. The electrodes 2a and 2b were made of the ITO or an oxide of the alloy which was filmed of indium and a small amount of tin by the sputtering method and the evaporation method. The resistance of the ITO can be freely adjusted, if necessary, but was set in the present embodiment to 20½/⎯ for both the electrodes 2a and 2b. A light absorbing layer 5 is placed below the reflection layer. The light absorbing layer 5 is made of a black background material containing carbon or the like for absorbing the visible light for the black-and-white display. In this case, the light absorbing layer 5 is seen white to the observer with the backward scattered light of the reflection layer 4 when no voltage is applied to the liquid crystal layer 3. When the voltage is applied to the liquid crystal layer 3, on the other hand, the light having passed through the fine pores of the reflection layer 4 is absorbed by the light absorbing layer so that it looks black.

For the reflection layer 4, not only the aluminum but also a material can be widely selected within the range of transmittance desired by the present invention. In addition to the aluminum, the present invention can employ a metal such as silver, nickel, chromium or palladium or their alloy or oxide. The alloy may be exemplified by the nichrome containing 80% of Ni and 20% of Cr. Two kinds of metallic films may be combined. For example, the reflection layer 4 was formed by forming a silver film of about 100 angstroms and then by forming an aluminum film of about 50 angstroms. The reflection layer 4 may be formed by combining a metallic film and a dielectric film. When the reflection layer 4 is formed exclusively of a metallic film, an absorption occurs in the reflection layer 4. This absorption can be reduced by using the dielectric film together. For example, a ZnS film is formed to have a thickness of about 600 angstroms, and an aluminum film is formed to have a thickness of about 40 angstroms thereby to form the reflection layer 4. A reversed structure, in which the dielectric film is formed after the aluminum film, maybe sufficient for the characteristics demanded.

This embodiment can also be applied to the structure, as exemplified in Embodiment 1 or Embodiment 2.

Embodiment 4

Figure 5A:
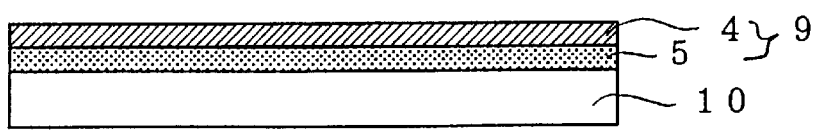
FIGS. 5A–5E are sections showing a construction of a reflection type liquid crystal display device of another embodiment of the present invention.

Another embodiment of the present invention will be specifically described with reference to FIG. 5. FIG. 5A presents a schematic section of the embodiment in which the reflection layer and the light absorbing layer of the present invention are integrated. A substrate 10 was made of a smooth glass plate but may be made of a transparent polymer film. An integral layer 9 was made of the reflection layer 4 and the light absorbing layer 5. A black resin (e.g., V259BK of Nippon Steel Chemical, Co., Ltd.) for the light absorbing layer 5 was applied to the substrate 10 with a thickness of about 1.5 $\mu$m by the spinner and was sintered at 250° C. for 30 minutes. Then, an aluminum film for the reflection layer 4 was formed to such a thickness by the sputtering apparatus that the optical reflectivity in the visible region might be within a range of 10 to 50%. In the present embodiment, the thickness was made to about 30 to 120 angstroms by the sputtering apparatus.

The substrate of the present embodiment having the integrated reflection layer and light absorbing layer will be described when the present invention is applied to Embodiments 1, 2 and 3.

Figure 5B:
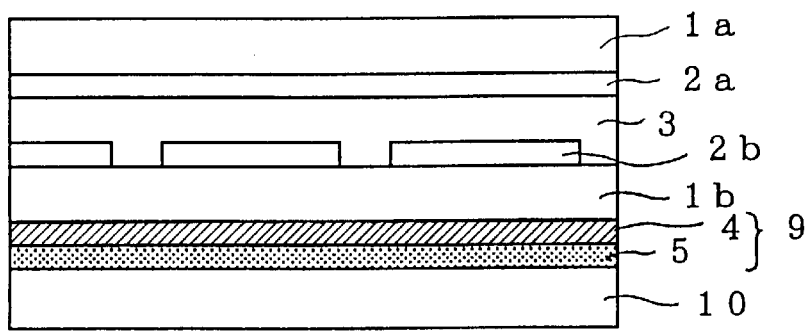
Figure 5C:
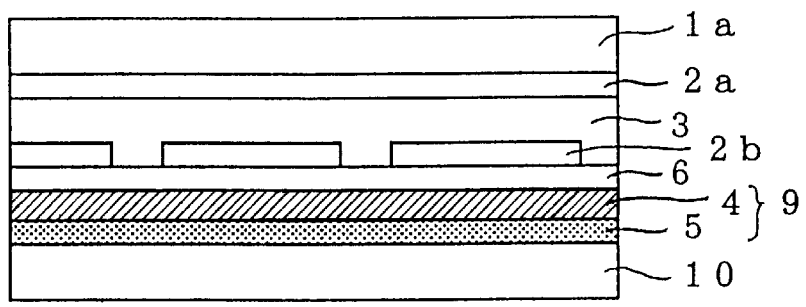

In an example of application to Embodiment 1, as shown in FIG. 5B or 5C, the layer having the integrated reflection layer and light absorbing layer is mounted on the outer face of the substrate 1b or on the inner face.

In FIG. 5B, the liquid crystal layer 3 is sandwiched between the transparent electrodes 2a and 2b of ITO or the like on the substrates 1a and 1b. The integral layer 9 of the light absorbing layer 5 and the reflection layer 4 is formed on the outside of the substrate 1b.

FIG. 5C shows an example in which the integral layer 9 of the light absorbing layer 5 and the reflection layer 4 is mounted on the substrate 10 of glass or polymer film and in which the electrodes 2b are on the insulating film 6. The liquid crystal layer 3 is sandwiched between the electrodes 2b and the transparent electrode 2a on the substrate 1a at the opposite side. This embodiment is freed from the double reflection because the reflection layer 4 is formed on the inner face.

Figure 5D:
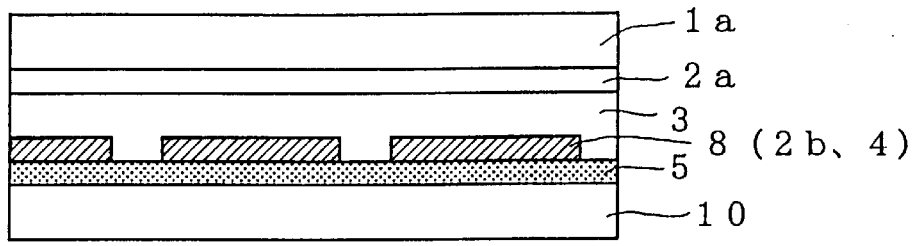

The example of application to Embodiment 2 is characterized, as shown in FIG. 5D, in that the integral layer of the reflection layer and the light absorbing layer is mounted on the inner face of the substrate 1b to prevent the double reflection, and in that it is provided with the electrode-reflector layer 8 in which one electrode for driving the light scattering type liquid crystal 3 also acts as the reflection layer. As a result, this application example can reduce the number of steps, improve the yield and reduce the cost. In this example, at least the electrode-reflector layer 8 contains a conductive material. The remaining construction is identical to that of Embodiment 2.

Figure 5E:
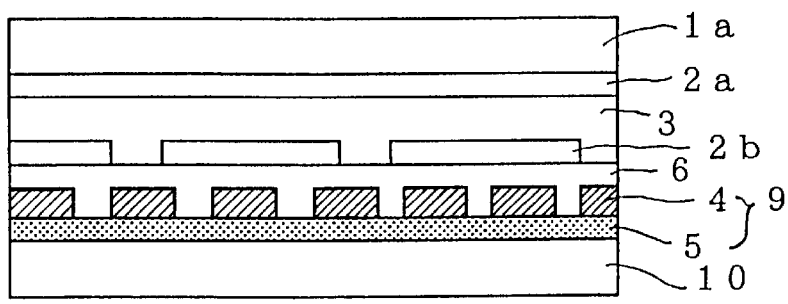
Figure 6A:
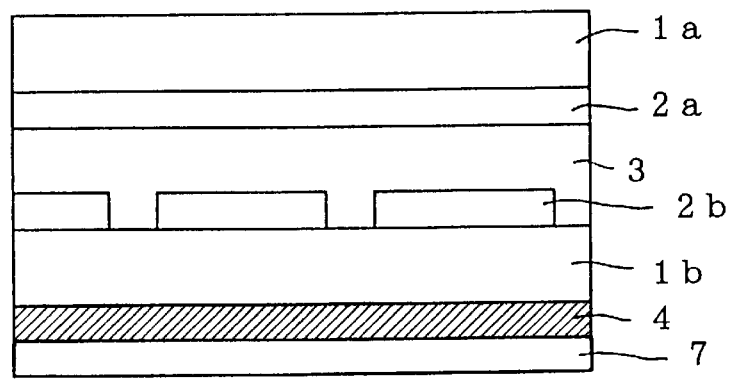
FIGS. 6A and 6B are sections showing a construction of a reflection type liquid crystal display device of the prior art.
Figure 6B:
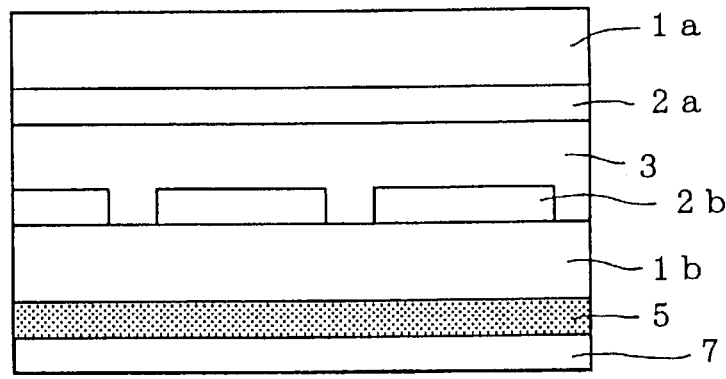

The example of application to Embodiment 3 is characterized, as shown in FIG. 5E, in that fine pores are formed in the reflection layer 4 of the integral layer 9 of the reflection layer and the light absorbing layer so that the reflectivity of the reflection layer is controlled by the numerical aperture of the reflection layer. Even in the case of the material such as a metallic film of low transmittance, the film thickness need not be thinned unlike Embodiment 1. For the desired reflectivity, however, the pores may be formed in the reflection layer by converting the area from the reflectivity intrinsic to the material.

In this example, the aluminum layer was formed as the reflection layer on the absorbing layer by the sputtering apparatus. In the present embodiment, the thickness was set to about 1,500 angstroms by the sputtering apparatus. Since the aluminum has a reflectivity of about 90% to the visible light, the fine pores were formed by converting the area so that the reflection layer 4 might have a reflectivity of 10 to 50%. For example, pores of 5 to 50 $\mu$m were formed by the area conversion to achieve the above-specified transmittance. The remaining construction was made identical to that of Embodiment 3.

For the reflection layer 4, not only the aluminum but also a material can be widely selected within the range of transmittance desired by the present invention. In addition to the aluminum, the present invention can employ a metal such as silver, nickel, chromium or palladium or their alloy or oxide. The alloy may be exemplified by the nichrome containing 80% of Ni and 20% of Cr. The reflection layer 4 may be made of a dielectric film or the like.

This example can also be applied to the structure of Embodiment 1, as shown in FIGS. 2A and 2B.

The present embodiment has been described on the light scattering type liquid crystal which is exemplified by the polymer network liquid crystal in the polymer scattered type liquid crystal. However, the liquid crystal may be exemplified by a polymer dispersed liquid crystal of cholesteric nematic phase transition liquid crystal mode, polymer dispersed liquid crystal mode, dynamic scattered liquid crystal mode (DSM), or thermal writing mode.

Embodiment 5

Figure 7:
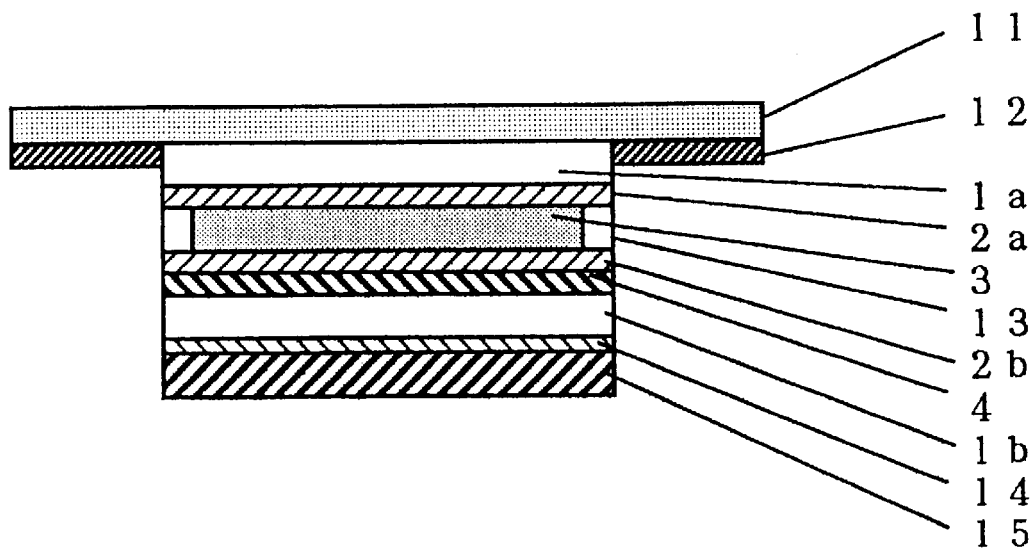
FIG. 7 is a section showing a construction of a reflection type liquid crystal display device of the present invention.
Figure 8:
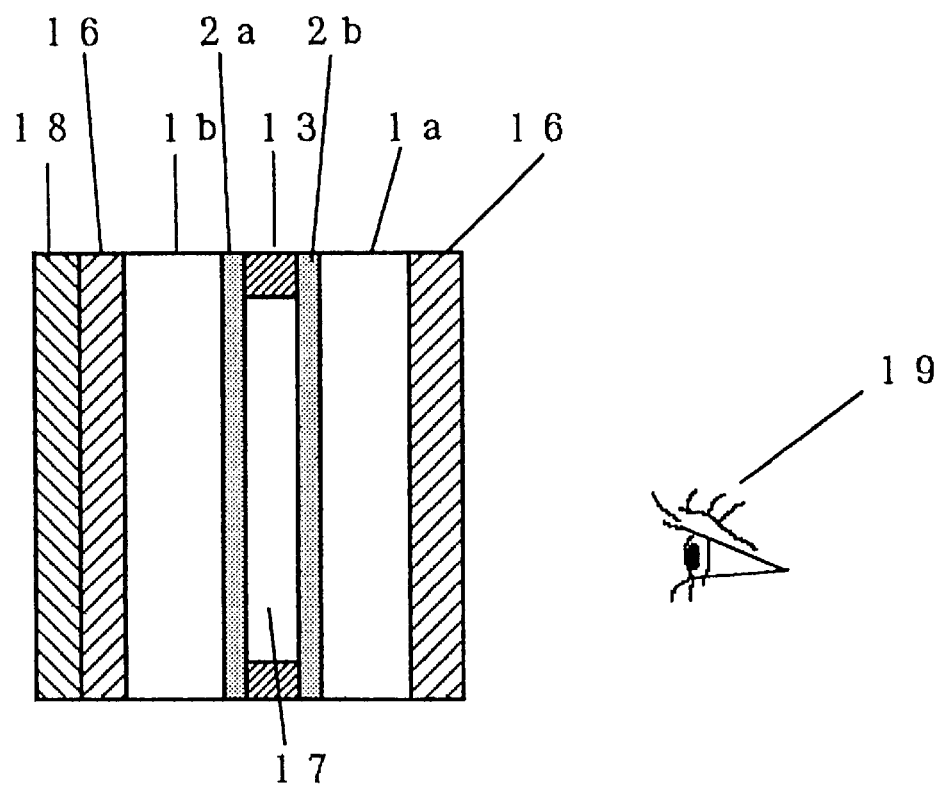
FIG. 8 is a section showing a construction of one example of a reflection type LCD of the prior art.
Figure 9:
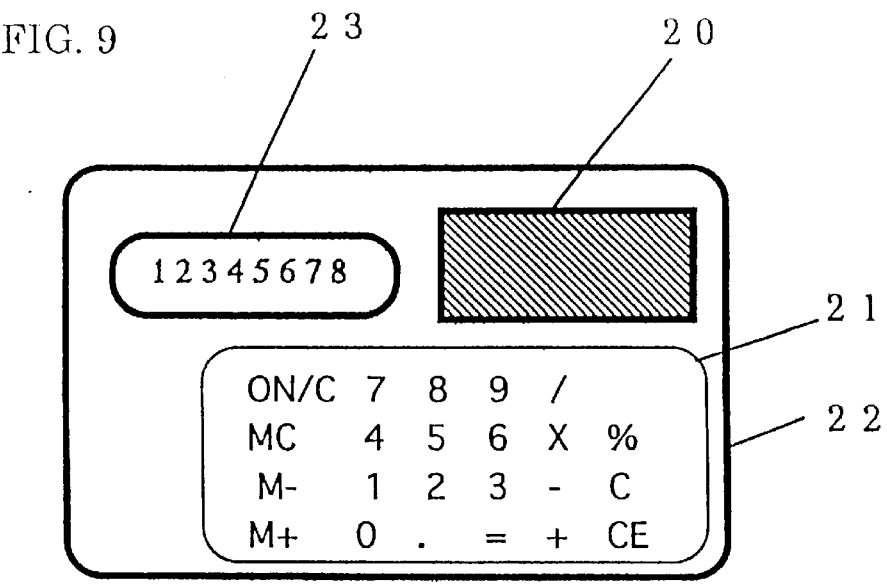
FIG. 9 is an exterior view of a card type electronic calculator in which are packaged the reflection type LCD of the prior art and a solar cell.
Figure 10:
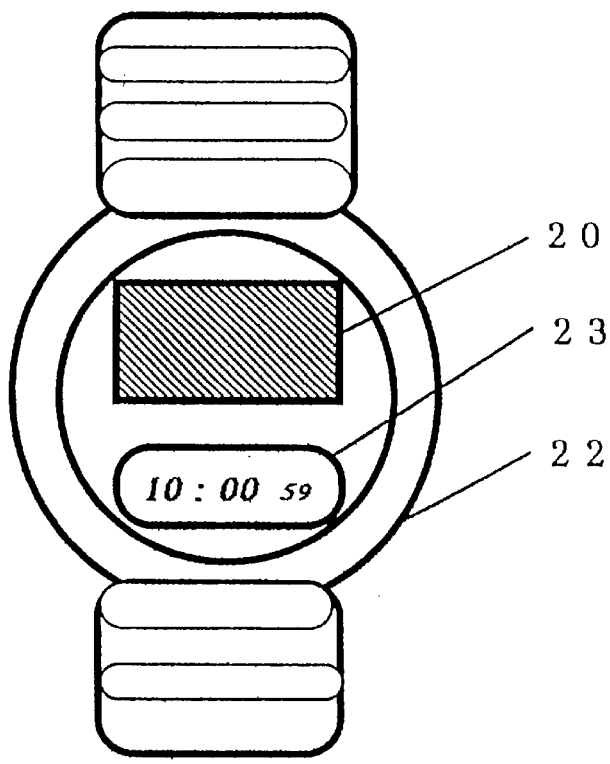
FIG. 10 is an exterior view of a digital wrist watch in which are packaged the reflection type LCD of the prior art and a solar cell.

In FIG. 7, the substrate 1a was made of a smooth glass plate but may be made of a transparent polymer film. The electrode 2a to be formed on the substrate 1a was separately formed of a transparent conductive film such as the ITO film by the photolithography.

On the other hand, the substrate 1b was made of a smooth glass plate but may be made of a polymer film. The reflection layer 4 to be formed on the substrate 1b was formed of a dielectric multi-layered film having the following three kinds of optical characteristics by the vacuum evaporator:

(a) a reflectivity of about 50% and a transmittance of about 50% to a light in the visible region, and a transmittance of 90% or more to a light in the near-infrared region;

(b) a reflectivity of about 30% and a transmittance of about 70% to a light in the visible region, and a transmittance of 90% or more to a light in the near-infrared region; and (c) a reflectivity of about 5% and a transmittance of about 95% to a light in the visible region, and a transmittance of 90% or more to a light in the near-infrared region.

Then, the electrode 2b was formed on the reflection layer 4. The electrode 2b was separately formed of a transparent conductive film of the ITO film by the photolithography. Next, an orienting agent of polyimide having a thickness of several tens nm to the electrodes 2a and 2b and was sintered to form the orienting film. Then, a spacer and an adhesive were scattered to cell gaps of 6 μm, 12 μm and 18 μm, and a peripheral sealing agent was printed to form the cell. Here: the substrate was given the cell gap of 6 μm for the reflection layer 4 under the condition (a); the substrate was given the cell gap of 12 μm for the reflection layer 4 under the condition (b); and the substrate was given the cell gap of 18 μm for the reflection layer 4 under the condition (c). A polymer network liquid crystal (PN-LC) was injected, while being heated, into the completed cells, and these cells were irradiated with the ultraviolet ray. With a view to measuring the transmittance of the liquid crystal layer, moreover, there was prepared a cell having no reflection layer 4 under the above-specified conditions. The drive voltages of 0 V and 5 V were applied to the prepared cells, and their transmittances were measured by using a fluorescent lamp as the light source and by using a light receiving element sized to measure the forward scattered light and the forward rectilinear light. The measurement results are tabulated in FIG. 22.

The scattering mode liquid crystal to be used in the liquid crystal layer 3 should not be limited to the polymer network liquid crystal but maybe exemplified by apolymer dispersed liquid crystal of cholesteric nematic phase transition liquid crystal mode, highly dielectric liquid crystal scattering mode, polymer dispersed liquid crystal mode, dynamic scattered liquid crystal mode (DSM), or thermal writing mode. Moreover, the liquid crystal may be combined with an active element such as the MIM or TFT to use the polymer disperse liquid crystal mode or the dynamic scattered liquid crystal mode (DSM).

The solar cell 15 is disposed below the substrate 1b in the following manner.

The solar cell 15 was an amorphous Si solar cell. This solar cell generates an output of 3 $\mu A/cm^2$ at an operating voltage of 1.5 V under the fluorescent lamp of 200 luxes. This solar cell was fixed below the substrate 1b through an adhesive layer 14.

The solar cell 15 may be exemplified not only by the amorphous Si solar cell but also by a single-crystalline Si solar cell, a polycrystalline Si solar cell, a CdS/Cu2S solar cell, a CdS/CdTe solar cell or a GaAs solar cell.

The reflection type liquid crystal display device thus manufactured was observed under the fluorescent lamp of 200 luxes. Then, the region, where the drive voltage was not sufficiently applied, was observed brightly in white because the incident white light was scattered. The region, where the drive voltage was sufficiently applied, was observed black because the incident white light was absorbed by the solar cell. Moreover, the appearances were different under the conditions of the reflection layer 4 and the cell gap, as follows:

Condition (a) of a reflectivity of about 50% and a transmittance of about 50%: the appearance of the gap of 6 μm was superior in whiteness and brightness to the TN liquid crystal of the prior art when OFF. When ON, the regularly reflected light from the reflection layer 4 exerted influences upon the appearance to make the black less visible.

Condition (b) of a reflectivity of about 30% and a transmittance of about 70%: the appearance of the gap of 12 μm was further superior than that of the condition (a) in whiteness and brightness to the TN liquid crystal of the prior art when OFF. When ON, the influences of the regularly reflected light from the reflection layer 4 were less to make the appearance more visible than that of the condition (a).

Condition (c) of a reflectivity of about 5% and a transmittance of about 95%: the appearance of the gap of 18 μm was drastically more white to display a true white like floss. When ON, the influences of the regularly reflected light from the reflection layer 4 were less than those of the condition (b) to make the appearance more visible.

Condition (a) of a reflectivity of about 50% and a transmittance of about 50%: the solar cell of the gap of 6 μm generated an output of 1.2 $\mu A/cm^2$ at the operating voltage of 1.5 V when OFF. When ON, the output was 1.4 $\mu A/cm^2$ at the operating voltage of 1.5 V.

Condition (b) of a reflectivity of about 30% and a transmittance of about 70%: the solar cell of the gap of 12 μm generated an output of 1.5 $\mu A/cm^2$ at the operating voltage of 1.5 V when OFF. When ON, the output was 1.9 $\mu A/cm^2$ at the operating voltage of 1.5 V.

Condition (c) of a ref lectivity of about 5% and a transmittance of about 95%: the solar cell of the gap of 18 μm generated an output of 1.4 $\mu A/cm^2$ at the operating voltage of 1.5 V when OFF. When ON, the output was 2.5 $\mu A/cm^2$ at the operating voltage of 1.5 V.

Moreover, the optical guide plate 11 was fixed on the substrate 1a by means of an optical adhesive. This optical guide plate 11 was molded of an acrylic resin having a high transparency. The optical guide plate 11 may desirably have an area larger by three times, as in the present embodiment, than that of a substrate 2.

Moreover, the condensing efficiency of the optical guide plate 11 is improved if the diffuse plate 12 is fixed on the side, as located at the substrate 1a, of the optical guide plate 11, other than the portion where the optical guide plate 11 and the substrate 1a are held in contact. The condensing efficiency is also improved by subjecting the optical guide end face of the optical guide plate 11.

The output of the solar cell was measured with the optical guide plate 11 being held in contact and under the fluorescent lamp of 200 luxes. It was confirmed that the output was improved by about 50% over that without the optical guide plate 11. The improvement in the display brightness was also confirmed.

Moreover, no shadow was seen to give an excellent visibility because the reflection layer 4 is interposed between the substrate 1a and the substrate 1b and because the distance between the reflection layer and the liquid crystal layer 3 is 1 micron at most.

Moreover, the reflection layer 4 may be formed on the back of the substrate 1b or on the surface of the solar cell 15. In this case, the shadow due to the parallax can be reduced by giving the substrate 1b a thickness of 0.7 mm or less.

Figure 15:
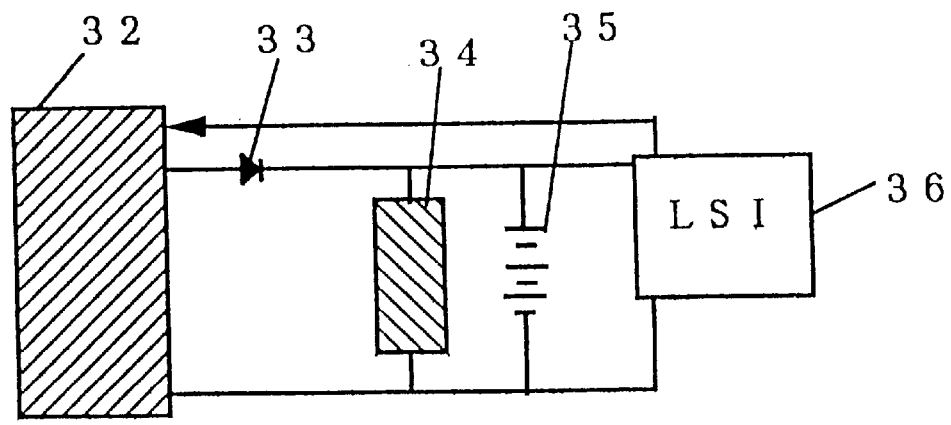
FIG. 15 is a circuit diagram showing an electronic calculator in which is packaged the reflection type liquid crystal display device of the present invention.

Next, the reflection type liquid crystal display device thus far described was packaged in an electronic calculator with the construction shown in FIG. 15. A power source is constructed to include a reflection type liquid crystal display device 32 according to the present invention, a reverse-current preventing diode 33, a voltage control circuit 34, and a secondary cell 35. This power source could exclusively drive an LSI 36 for the electronic calculator and the liquid crystal display unit of the reflection type liquid crystal display device 32 according to the present invention.

Figure 16:
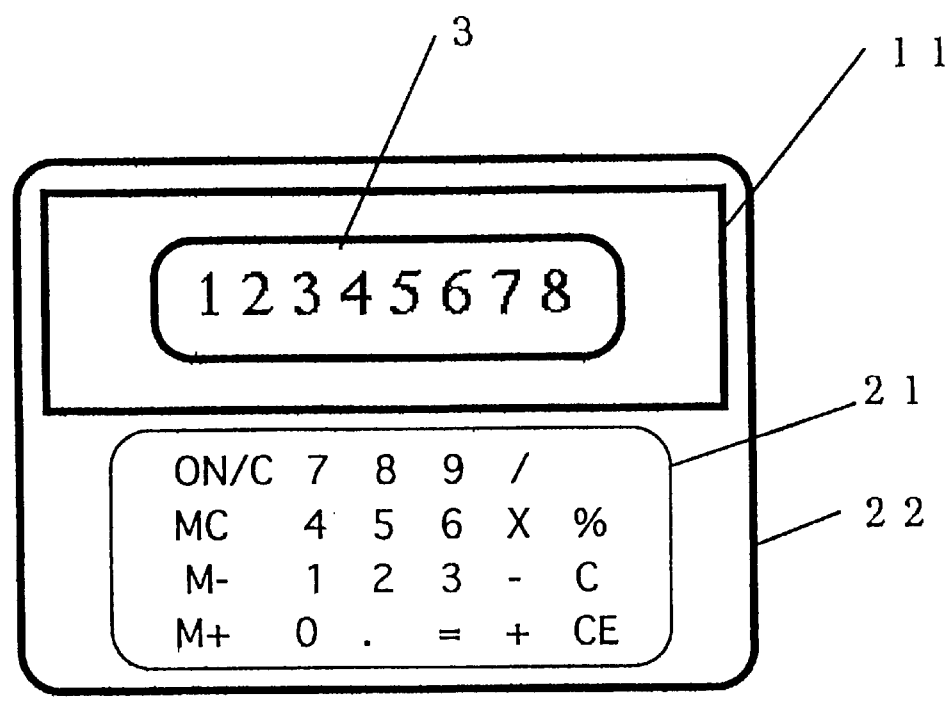
FIG. 16 is an exterior view of the electronic calculator in which is packaged the reflection type liquid crystal display device of the present invention.

On the other hand, FIG. 16 presents an appearance of the electronic calculator which is not in the prior art because the reflection type liquid crystal display device 32 according to the present invention is packaged. Since no space is required on the surface of the panel for the solar cell, it is possible to prepare a wide area for the liquid crystal layer 3 and a key input unit 21. This makes the display unit visible and the key input unit easily operable. Moreover, the observation of the display unit has revealed that the display is in black on the white background as pure as the floss, and that the display is brighter and more visible than that of the TN type LCD. Especially in the indoor use, advantages over the electronic calculator of the prior art can be realized in the easily observable display and in the power generating ability.

Figure 17:
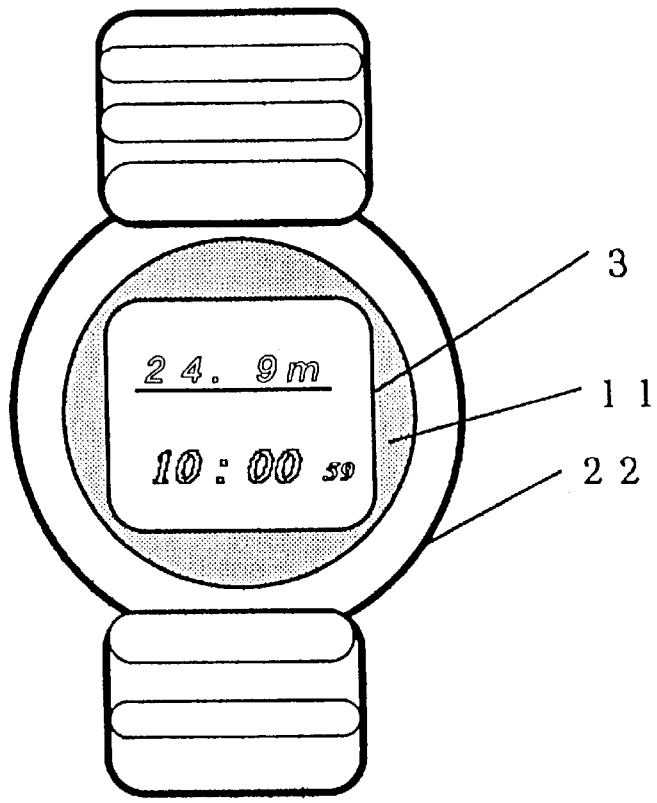
FIG. 17 is an exterior view of a digital wrist watch in which is packaged the reflection type liquid crystal display device of the present invention.

Next, FIG. 17 presents an appearance of the case in which the reflection type liquid crystal display device of the present invention is packaged in a digital wrist watch. The area of the display unit was enlarged to make the display more visible. Moreover, the blackish solar cell disappeared from the surface panel so that the rusticity in the design was eliminated. The black display on the white background as bright as the paper white made the digital watch elegant to add a new value to the digital watch using the TN type LCD of the prior art. Still moreover, a sufficient power could be supplied for the use in a dark room.

Embodiment 6

Figure 18:
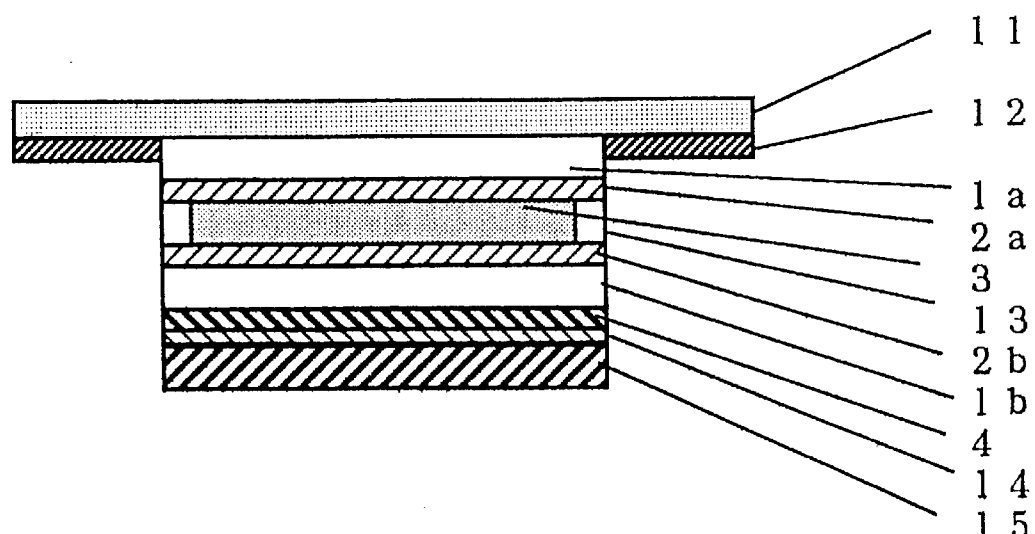
FIG. 18 is a section showing a construction of Embodiment 6 of the present invention.

Here will be described a sixth embodiment in which a positive phase transition color liquid crystal is used in the liquid crystal layer. In FIG. 18, the substrates 1a and 1b were made of flat glass plates, but one of them may be made of a transparent polymer sheet. The electrode 2a to be mounted on the substrates 1a and 1b was separately formed of a transparent conductive film of the ITO film by the photolithography.

Figure 19:
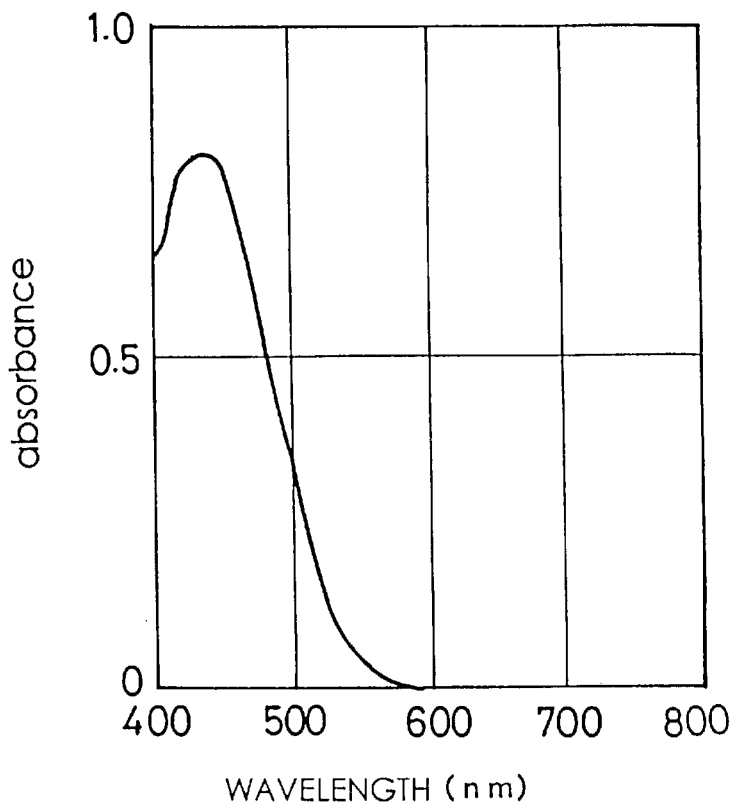
FIG. 19 is a diagram illustrating the spectral absorbance characteristics of a guest dye M-570.
Figure 20:
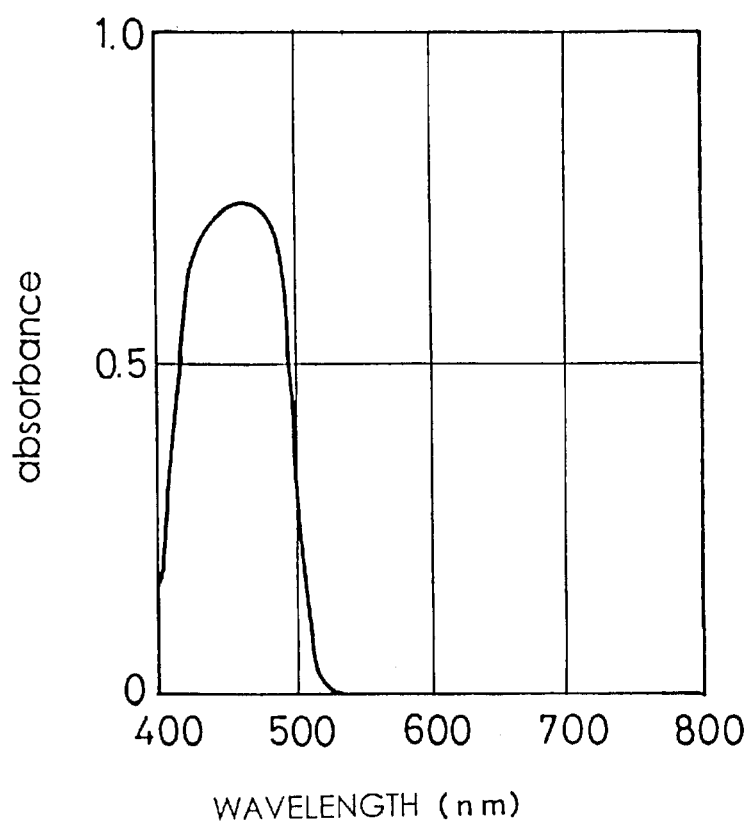
FIG. 20 is a diagram illustrating the spectral absorbance characteristics of a guest dye M-361.

Then, an orienting film was formed over the electrodes 2a and 2b by applying and sintering a vertical orienting agent of polyimide having a thickness of several tens nm. A spacer and an adhesive were scattered to give a cell gap of 7 $\mu$m, and a peripheral sealing agent was printed to complete the cell. The liquid crystal layer 3 was formed by injecting the following liquid crystal mixture into the completed cell. The host liquid crystal was exemplified by EN-31G (of Chisso Corporation) of low viscosity. The chiral pitch of the host liquid crystal was controlled to 13.7 $\mu$m by adding an optically active substance CM-33 (of Chisso Corporation). Two kinds of guest dyes of M-570 (for the orange) and M-361 (for the yellow) of Mitsui Touatsu Dyes Ltd. were used. Their spectral absorbances are illustrated in FIGS. 19 and 20.

The diffuse layer 30 to be formed below the substrate 1b was prepared by preparing a dielectric multi-layered film on a polycarbonate substrate by the vacuum evaporator and by coating it with diffuse beads. The optical characteristics are the following two kinds:

(d) A reflectivity of about 70% and a transmittance of about 30% to the light in the visible region, A transmittance of 90% or more to the light in the near-infrared region; and (e) A reflectivity of about 30% and a transmittance of about 70% to the light in the visible region,
A transmittance of 90% or more to the light in the near-infrared region.

The transmittances were measured by applying drive voltages of 0 V and 3 V to the cells, which were prepared by adding M-361 (for the yellow color) to the substrate having the diffuse layer 30 under the condition (d) and M-570 (for the orange color) to the substrate having the diffuse layer 30 under the condition (e), and by using a fluorescent lamp as the light source. The measurement results are tabulated in FIG. 23.

The guest-host mode liquid crystal to be used in the liquid crystal layer 3 may be exemplified not only by the positive phase transition color liquid crystal but also by a highly dielectric liquid crystal guest-host mode or apolymer dispersed liquid crystal guest-host mode. An active element such as the MIM or the TFT may be combined.

The solar cell 15 was placed under the diffuse layer 30.

The solar cell 15 was exemplified by a single-crystalline Si solar cell. This solar cell generates an output of 4 $\mu$A/cm$^2$ at an operating voltage of 1.5 V under an incandescent lamp of 200 luxes. The solar cell was fixed below the diffuse layer 30 through the adhesive layer 14.

The solar cell 15 may be exemplified not only by the single-crystalline Si solar cell but also by a polycrystalline Si solar cell, a CdS/Cu2S solar cell, a CdS/CdTe solar cell or a GaAs solar cell.

The reflection type liquid crystal display device thus manufactured was observed under the illumination condition of a incandescent lamp of 200 luxes. The region, where the drive voltage was not sufficiently applied, was seen in a bright white color because the incident white light was scattered. The incident white light looked as colored for the region, where the drive voltage was sufficiently applied. The appearances were different depending upon the conditions of the diffuse layer 30 and the guest dyes, as follows:

For the condition (d) of the reflectivity of about 70% and the transmittance of about 30%, the appearance was superior in brightness to the TN liquid crystal of the prior art when OFF. When ON, the appearance was a bright yellow display.

For the condition (e) of the reflectivity of about 30% and the transmittance of about 70%, the appearance was slightly darker than that of the condition (d), as compared with the TN liquid crystal of the prior art when OFF. When ON, the appearance was clear orange and visible.

Under similar conditions, the power generating abilities of the solar cell were examined.

For the condition (d) of the reflectivity of about 70% and the transmittance of about 30%, the solar cell generated an output of 2 $\mu$A/cm$^2$ at the operating voltage of 1.5 V when OFF. When ON, the output was 1.4 $\mu$A/cm$^2$ at the operating voltage of 1.5 V.

For the condition (e) of the reflectivity of about 30% and the transmittance of about 70%, the solar cell generated an output of 3 $\mu$A/cm$^2$ at the operating voltage of 1.5 V when OFF. When, the output was 1.9 $\mu$A/cm$^2$ at the operating voltage of 1.5 V.

Moreover, the optical guide plate 11 was fixed on the substrate 1a by using an optical adhesive. The optical guide plate 11 was molded by mixing a fluorescent material (ER-120 of Mitsui Touatsu Dyes Ltd.) for absorbing a light of 400 nm or less into a light having a waveform of 600 to 700 nm, into an acrylic resin of high transparency. The optical guide plate 11 was made to have an area of three times as large as the substrate, as desired.

Moreover, the condensing efficiency of the optical guide plate 11 is improved if the diffuse plate 12 is fixed on the side, as located at the substrate 1a, of the optical guide plate 11, other than the portion where the optical guide plate 11 and the substrate 1a are held in contact.

The output of the solar cell was measured with the optical guide plate 11 being held in contact and under the incandescent lamp of 200 luxes. It was confirmed that the output was improved by about 50% over that without the optical guide plate 11. The improvement in the display brightness was also confirmed.

Next, the reflection type liquid crystal display device thus far described was packaged in an electronic calculator with the construction shown in FIG. 15. A power source is constructed to include a reflection type liquid crystal display device 32 according to the present invention, a reverse-current preventing diode 33, a voltage control circuit 34, and a secondary cell 35. This power source could exclusively drive an LSI 36 for the electronic calculator and the liquid crystal display unit of the reflection type liquid crystal display device 32 according to the present invention.

On the other hand, FIG. 16 presents an appearance of the electronic calculator which is not in the prior art because the reflection type liquid crystal display device 32 according to the present invention is packaged. Since no space is required on the surface of the panel for the solar cell, it is possible to prepare a wide area for the liquid crystal layer 3 and a key input unit 21. This makes the display unit visible and the key input unit easily operable. Moreover, the observation of the display unit has revealed that the display is colored on the white background, and that the display is brighter and more visible than that of the TN type LCD. Especially in the indoor use, advantages over the electronic calculator of the prior art can be realized in the easily observable display and in the power generating ability.

Next, FIG. 17 presents an appearance of the case in which the reflection type liquid crystal display device of the present invention is packaged in a digital wrist watch. The area of the display unit was enlarged to make the display more visible. Moreover, the blackish solar cell disappeared from the surface panel so that the rusticity in the design was eliminated. The colorful display on the white background made the digital watch vigorous to add a new value to the digital watch using the TN type LCD of the prior art. Still moreover, a sufficient power could be supplied for the use in a dark room.

Embodiment 7

Figure 21:
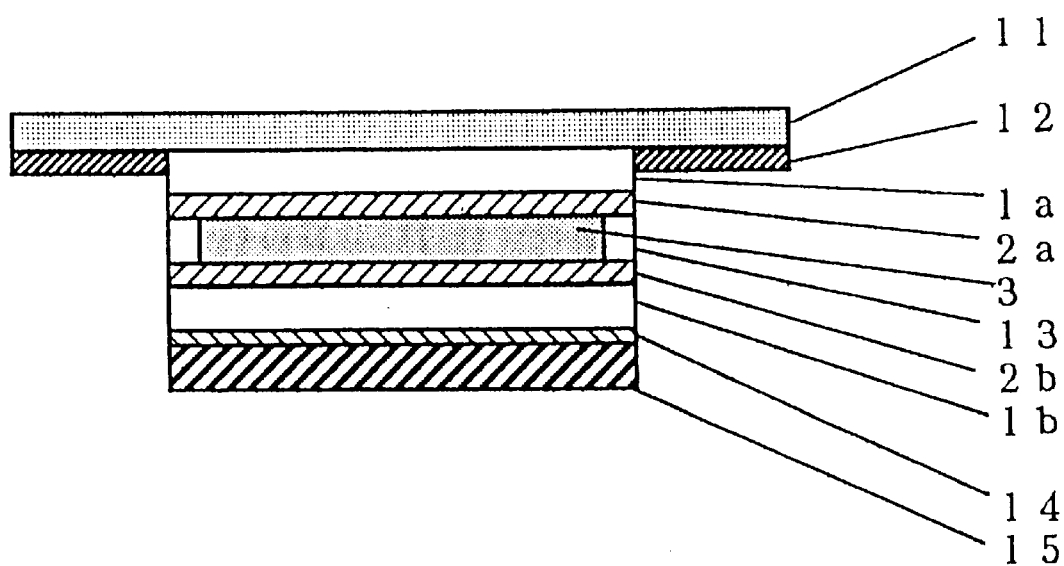
FIG. 21 is a section showing a construction of Embodiment 7 of the present invention.

Here will be described a seventh embodiment in which a polymer dispersed cholesteric liquid crystal making use of the Bragg reflection effect is used in the liquid crystal layer. In FIG. 21, the substrates 1a and 1b were made of flat glass plates, but one of them may be made of a transparent polymer sheet. The electrode 2a to be mounted on the substrates 1a and 1b was separately formed of a transparent conductive film of the ITO film by the photolithography.

Then, an orienting film was formed over the electrodes 2a and 2b by applying and sintering a vertical orienting agent of polyimide having a thickness of several tens nm. A spacer and an adhesive were scattered to give a cell gap of 5 $\mu$m, and a peripheral sealing agent was printed to complete the cell. The liquid crystal layer 3 was formed by injecting the mixture (E48/CE2/CB15/NOA65: 0.49/0.18/0.18/0.15) of a liquid crystal, an optically active substance and a photosetting resin. The photosetting condition was to set the mixture by heating it to 65° C. and subjecting it to an ultraviolet ray of 25 mW/cm$^2$.

The transmittances of the cells thus manufactured were measured by applying the drive voltages of 0 V and 3 V and by using a fluorescent lamp as the light source. The measurement results were tabulated in FIG. 24. The cells exhibited a selective reflection of green color with no voltage application and turned transparent at 15 V.

The polymer dispersed cholesteric liquid crystal to be used in the liquid crystal layer 3 may be replaced by the holographic polymer dispersed liquid crystal mode. Moreover, an active element such as the MIM or the TFT can be combined.

The solar cell 15 was placed under the diffuse layer 30.

The solar cell 15 was exemplified by a single-crystalline Si solar cell. This solar cell generates an output of 3.5 $\mu$A/cm$^2$ at an operating voltage of 1.5 V under an incandescent lamp of 200 luxes. The solar cell was fixed below the liquid crystal layer 3 through the adhesive layer 14.

The solar cell 15 may be exemplified not only by the polycrystalline Si solar cell but also by an amorphous Si solar cell, a single-crystalline Si solar cell, a CdS/Cu2S solar cell, a CdS/CdTe solar cell or a GaAs solar cell.

The reflection type liquid crystal display device thus manufactured was observed under the illumination condition of a incandescent lamp of 200 luxes. The region, where the drive voltage was not sufficiently applied, was seen in a bright green color because the incident white light was Bragg-reflected. The incident white light was absorbed by the solar cell and looked black for the region, where the drive voltage was sufficiently applied. The wavelength of the Bragg reflection can be changed to blue, yellow, orange and red depending upon the liquid crystal, the optically active substance and the photosetting conditions.

Under similar conditions, the power generating abilities of the solar cell were examined.

The solar cell generated an output of 2 $\mu$A/cm$^2$ at the operating voltage of 1.5 V when OFF. When ON, the output was 2.2 $\mu$A/cm$^2$ at the operating voltage of 1.5 V.

Moreover, the optical guide plate 11 was fixed on the substrate 1a by using an optical adhesive. The optical guide plate 11 was molded by mixing a fluorescent material (ER-120 of Mitsui Touatsu Dyes Ltd.) for absorbing a light of 400 nm or less into a light having a waveform of 600 to 700 nm, into an acrylic resin of high transparency. The optical guide plate 11 was made to have an area of three times as large as the substrate, as desired.

Moreover, the condensing efficiency of the optical guide plate 11 is improved if the diffuse plate 12 is fixed on the side, as located at the substrate 1a, of the optical guide plate 11, other than the portion where the optical guide plate 11 and the substrate 1a are held in contact.

The output of the solar cell was measured with the optical guide plate 11 being held in contact and under the incandescent lamp of 200 luxes. It was confirmed that the output was improved by about 50% over that without the optical guide plate 11. The improvement in the display brightness was also confirmed.

Next, the reflection type liquid crystal display device thus far described was packaged in an electronic calculator with the construction shown in FIG. 15. A power source is constructed to include a reflection type liquid crystal display device 32 according to the present invention, a reverse-current preventing diode 33, a voltage control circuit 34, and a secondary cell 35. This power source could exclusively drive an LSI 36 for the electronic calculator and the liquid crystal display unit of the reflection type liquid crystal display device 32 according to the present invention.

Next, FIG. 17 presents an appearance of the case in which the reflection type liquid crystal display device of the present invention is packaged in a digital wrist watch. The area of the display unit was enlarged to make the display more visible. Moreover, the blackish solar cell disappeared from the surface panel so that the rusticity in the design was eliminated. The black display on the bright iridescent-colored background made the digital watch profound to add a new value to the digital watch using the TN type LCD of the prior art. Still moreover, a sufficient power could be supplied for the use in a dark room.

Embodiment 8

Figure 25:
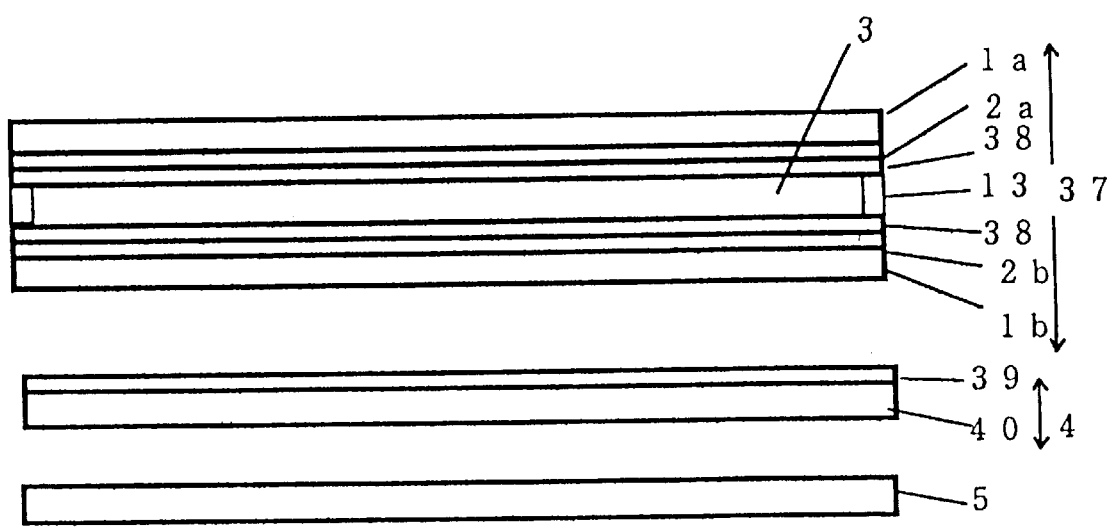
FIG. 25 is a section showing a construction of an embodiment of the present invention.

With reference to FIG. 25, here will be sequentially described the manufacture of the reflection type liquid crystal display device of the present invention, which is constructed to include: a light scattering mode display element 37; a reflection layer 4 disposed at the back of the display element 37 for reflecting a specific color of the visible light; and a light absorbing layer 5 disposed at the back of the reflection layer 4.

Here will be described the manufacture of the light scattering mode display element 37. The substrates 1a and 1b were made of hard glass having a thickness of 0.4 mm. The electrodes 2a and 2b are formed on the substrates 1a and 1b. In the present embodiment, there was used the transparent conductive film which was made of the In2O3-SnO2 film (as will be called the "ITO" film) by the sputtering method or the vacuum evaporation method and which was patterned by the photolithography. This pattern was designed to display characters of seven segments. The SnO2 film may be used in place of the ITO film. Insulating films 38a and 38b were formed thereover followed by a spacer 13 to manufacture a vacant cell. The cell gap was adjusted to 8 μm.

The liquid crystal layer 3 was exemplified in the present embodiment by the polymer network liquid crystal.

More specifically, the liquid crystal material was prepared by vacuum-injecting the "PNM-156" of Rodic Inc. into the vacant cell while keeping the temperature of 30° C. This liquid crystal material was irradiated, while being kept at a temperature of 25.5° C., with an ultraviolet ray of 75 mW/cm$^2$ for ninety seconds by a metallic halide lamp, to prepare the light scattering mode display element 37 having the liquid crystal layer 3. The wavelength of the ultraviolet ray was achieved by using a filter for absorbing a wavelength of 350 nm or less. For initiating the irradiation of the ultraviolet ray, it is important that the irradiation can be instantly initiated by a shutter from the lamp which is ready for irradiating the an intensity of 75 mW/cm$^2$. Moreover, the temperature for the vacuum injection and the temperature for the ultraviolet ray irradiation have to be higher than the phase conversion level of the liquid crystal material. Especially the temperature of the ultraviolet irradiation may be set higher by 1.5° C. than the phase conversion level.

The liquid crystal layer 3 of the light scattering mode display element 37 thus manufactured was observed by using the scanning type electronic microscope and was confirmed that it has the three-dimensional network structure made of the polymer.

The electrooptical characteristics were measured by the photometer made by Canon Inc. If the transmittance is designated at To for no voltage application and at 100% when it is saturated with the increase in the applied voltage. The applied voltage indicating a transmittance of 90% is designated by Vsa, and the applied voltage indicating a transmittance of 10% is designated by Vth.

The result of measurements were as follows:
Vth=1.4 V
Vsa=2.9 V
TO=2.5%
Absolute Transmittance
at Vsa=83%
Current Consumption
at Vsa=0.5 μA/cm$^2$.

The reflection layer 4 was exemplified in the present embodiment by glass 40 of a thickness of 0.3 mm, which was prepared by vacuum-evaporating a dielectric multi-layered thin film 39 characterized to transmit a light within a specific wavelength range in the visible region and to reflect the remaining visible lights.

Of the materials to be used in the dielectric thin film, a lower refractive index transparent dielectric thin film was exemplified by SiO2, MgF2 or Na3AlF6, and a higher refractive index transparent dielectric thin film was exemplified by TiO2, ZrO2, Ta2O5, ZnS, ZnSe, ZnTe, Si, Ge, Y2O3 or Al2O3. The dielectric material, the film thickness and the layer number are set according to the reflection wave band, the transmittance wave band, the reflectivity and the transmittance, as required. These dielectric thin films can be easily formed by the vacuum evaporation method or the sputtering method. The dielectric multi-layered thin film 39 has a higher degree of freedom for the design than the metallic thin film because the various spectral characteristics can be achieved by changing the construction of the multi-layered thin film.

Figure 26:
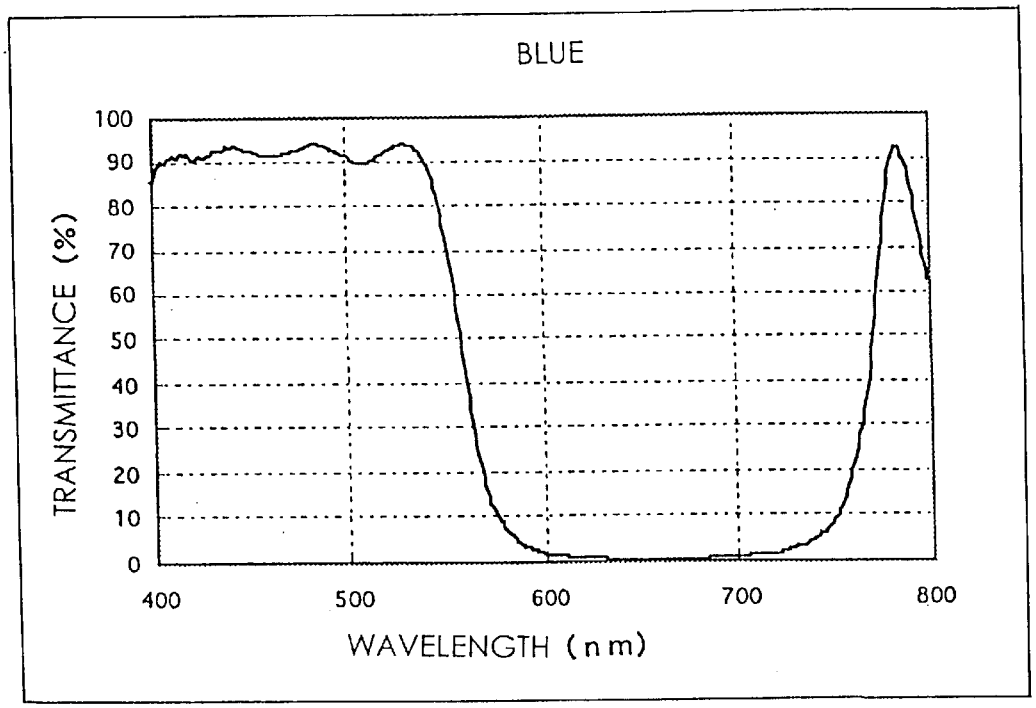
FIG. 26 is a diagram illustrating one example of the measurement data of a spectral transmittance and a spectral reflectivity of a reflection layer of the present invention.
Figure 27:
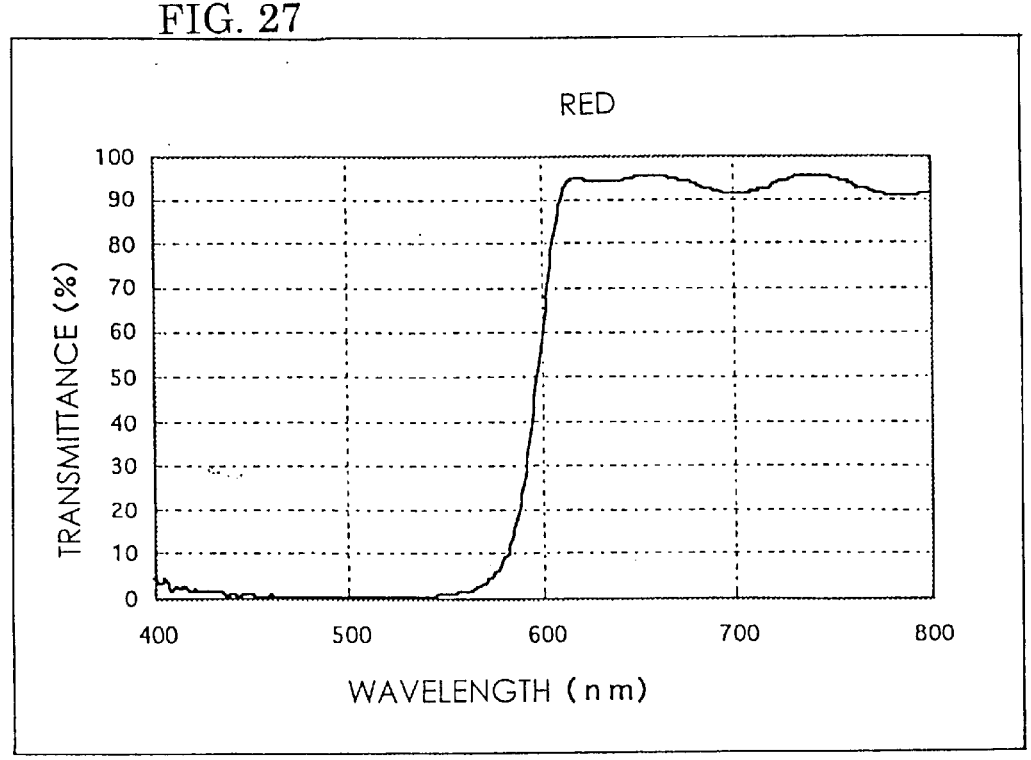
FIG. 27 is a diagram illustrating one example of the measurement data of a spectral transmittance and a spectral transmittance of a reflection layer of the present invention.

In the present embodiment, the reflection layer 4, as shown in FIG. 26, for transmitting the blue and reflecting the yellow and the reflection layer 4, as shown in FIG. 27, for transmitting the red and reflecting the blue were individually prepared by the vacuum evaporator. These dielectric multi-layered thin films 39 were formed by laminating twenty five to thirty layers of the higher refractive index films of TiO2 and the lower refractive index films of SiO2.

The light absorbing layer 5 was exemplified by the Lumimat X-30 of Tray Industries, Inc. as the black PET film.

The display appearances of the reflection type liquid crystal display device of the present invention thus manufactured were evaluated under the illumination of a fluorescent lamp on the ceiling, by connecting the display device with a watch drive IC and a battery and by packaging it in a wrist watch. As a result, the watch using the reflection layer, as shown in FIG. 26, for transmitting the blue and reflecting the yellow could express the time in the black segment display on the bright yellow background. The watch using the reflection layer, as shown in FIG. 27, for transmitting the red and reflecting the blue could express the time in the black segment display on the bright blue background. Especially the colored background could provide the bright display having no dependency on the visual angle because of the intensive scattering properties featuring the polymer network liquid crystal. The display state was in the quality which could not be achieved by the light scattering liquid crystal of the prior art, thereby to enhance the value of the wrist watch as the ornaments or craftworks. Moreover, the drive voltage was as low as 3 V, and the current to be consumed was 0.32 μA only for the light scattering mode display element. The CR2025 type lithium battery, as used, could give the wrist watch a battery lifetime of three years or longer.

Embodiment 9

With reference to FIG. 25, here will be sequentially described the reflection type liquid crystal display device of the present invention, which was constructed to include: a light scattering mode display element 37; a reflection layer 4 disposed at the back of the display element 37 for reflecting a specific color of the visible light; and a solar cell 15 arranged at the back of the reflection layer 4 in place of the light absorbing layer 5.

The light scattering mode display element 37 was prepared by the same process as that of Embodiment 8.

Figure 28:
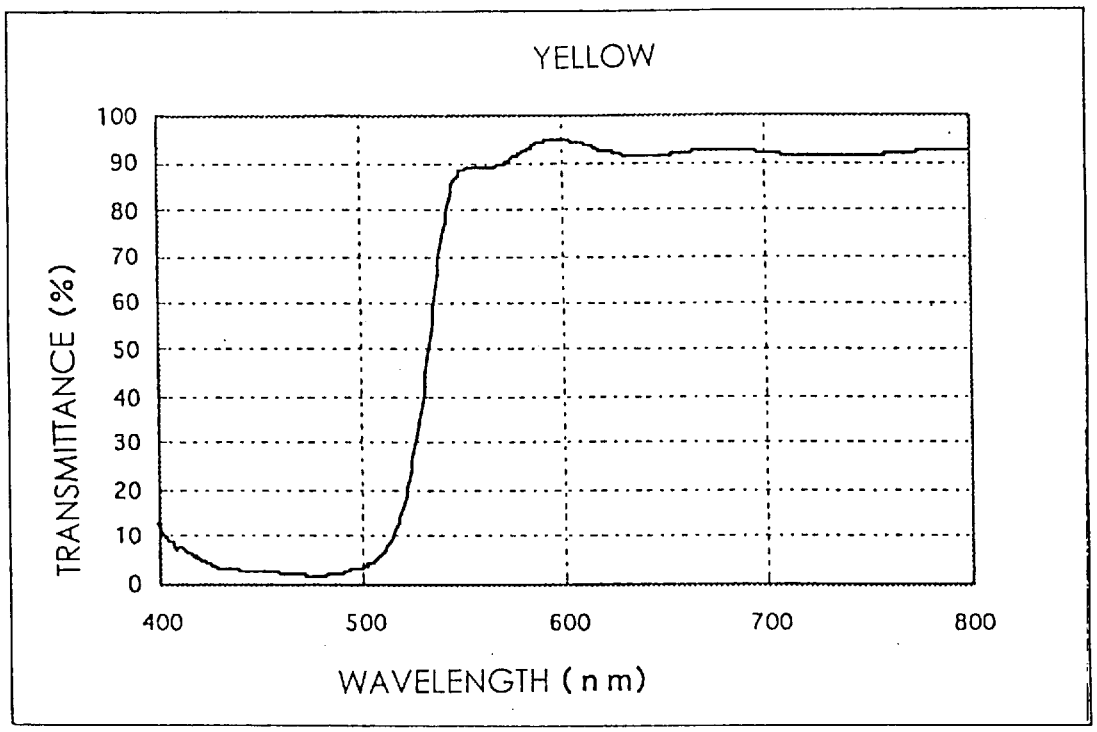
FIG. 28 is a diagram illustrating one example of the measurement data of a spectral transmittance and a spectral reflectivity of a reflection layer of the present invention.

The reflection layer 4 was exemplified in the present embodiment by a glass 40 having a thickness of 0.3 mm, which was prepared by vacuum-evaporating the dielectric multi-layered thin film 39 characterized to transmit the light within the specific wavelength range in the visible region and to reflect the remaining visible light. The manufacture method was similar to that of Embodiment 8. In the present embodiment, the reflection layer 4, as shown in FIG. 28, for transmitting the blue and reflecting the yellow was prepared by the vacuum evaporator.

The solar cell 15 was exemplified by the amorphous Si solar cell. This solar cell generated an output of 3 $\mu A/cm^2$ at the operating voltage of 1.5 V under the fluorescent lamp of 200 luxes. This solar cell was fixed below the substrate 1b through the adhesive layer 14.

The light scattering mode display element 37, the reflection layer 4 and the solar cell 15 were arranged in optical contact. The reflection type liquid crystal display device thus manufactured was observed under the illumination condition of a incandescent lamp of 200 luxes. The region, where the drive voltage was not sufficiently applied, was seen in a bright blue color because the incident white light was scattered. The incident white light was absorbed by the solar cell and looked black for the region, where the drive voltage was sufficiently applied.

Then, the power generating abilities of the solar cell were examined.

The solar cell generated an output of 1.5 $\mu A/cm^2$ at the operating voltage of 1.5 V when OFF. When ON, the output was 1.9 $\mu A/cm^2$ at the operating voltage of 1.5 V.

Like Embodiment 5, the optical guide plate 11 was fixed on the substrate 1a by means of an optical adhesive. As a result, it was confirmed that the output of the solar cell was improved by about 50% and that the display brightness was also improved.

Then, the display appearances were evaluated under the illumination of a fluorescent lamp on the ceiling, by packaging it in a wrist watch. As a result, the watch using the reflection layer, as shown in FIG. 28, for transmitting the yellow and reflecting the blue could express the time in the black segment display on the bright blue background. Especially the colored background could provide the bright display having no dependency on the visual angle because of the intensive scattering properties featuring the polymer network liquid crystal. The display state was in the quality which could not be achieved by the light scattering liquid crystal of the prior art, thereby to enhance the value of the wrist watch as the ornaments or craftworks. Moreover, the power source, as composed of the solar cell of the reflection type liquid crystal display device, the reverse flow preventing diode 33, the voltage control circuit 28 and the secondary cell 35, could exclusively drive the watch driving IC and the liquid crystal display unit of the reflection type liquid crystal display device 32 of the present invention. This drive could be achieved by the reflection layer which was featured by the low-drive voltage, the high scattering properties and the efficient color separation from the polymer network liquid crystal.

Embodiment 10

With reference to FIG. 25, here will be sequentially described the manufacture of the reflection type liquid crystal display device of the present invention, which is constructed to include: a light scattering mode display element 37; a reflection layer 4 disposed at the back of the display element 37 for reflecting a specific color of the visible light; and a solar cell 15 disposed at the back of the reflection layer 4.

The light scattering mode display element 37 was exemplified by the polymer-stabilized phase conversion type liquid crystal layer which was given a structure having a planar texture or focal-conic texture stabilized by the three-dimensional net shaped photo-setting resin dispersed in the cholesteric/nematic phase conversion type liquid crystal.

The mixture solution, which was composed of 95.7 wt. % of the chlorine nematic liquid crystal TL215 (of Merck & Co., Inc.), 2.3 wt. % of chiral agent S811 (of Merck & Co., Inc.), 1.9 wt. % of polymer polymer resin precursor 2.7-diacryloyl oxyfluoren and 0.1 wt. % of polymerization initiator of benzoyl methyl-ether, was vacuum-injected into the same vacant cell as that of Embodiment 5, as horizontally oriented in the isotropic state. This cell was irradiated, while being kept at 21° C., to an intensity of 0.1 $mW/cm^2$ for sixty min. and then to 40 $mW/cm^2$ for 20 secs. to set the polymer resin precursor by the metallic halide lamp using a filter for transmitting an ultraviolet ray of 350 nm to 400 nm.

The liquid crystal layer 3 of the light scattering mode display element 37 was observed by using the scanning type electronic microscope and was confirmed that it has the three-dimensional net structure made of the polymer.

The electrooptical characteristics are measured by the photometer made by Canon Inc. Here: the absolute transmittance is designated at TO for no voltage application; the relative transmittance for no voltage application is 100%; the transmittance decreased and saturated with the increase in the applied voltage is 0%; the applied voltage indicating a transmittance of 10% is designated by Vsa; and the applied voltage indicating a transmittance of 90% is designated by Vth.

The result of measurements were as follows:

Vth=4 V

Vsa=5.9 V

TO=81%

Absolute Transmittance at Vsa=3.9%

Current Consumption at Vsa=0.98 $\mu A/cm^2$.

By using the manufactured light scattering mode display element 37 nd the same reflection layer and solar cell as those of Embodiment 9, the display appearances were evaluated under the illumination of a fluorescent lamp on the ceiling, by packaging it in a wrist watch. As a result, the watch using the reflection layer, as shown in FIG. 28, for transmitting the yellow and reflecting the blue could express the time in the segment display of blue diffuse color on the background in the black excepting the regular blue reflection. Especially the black background could provide the black display having no dependency on the visual angle because of the transparency having no dependency on the visual angle and featuring the polymer stabilized phase transition type liquid crystal. The display state was in the quality which could not be achieved by the light scattering liquid crystal of the prior art, thereby to enhance the value of the wrist watch as the ornaments or craftworks. Moreover, the power source, as composed of the solar cell of the reflection type liquid crystal display device, the reverse flow preventing diode 33, the voltage control circuit 28 and the secondary cell. 35, could exclusively drive the watch driving IC and the liquid crystal display unit of the reflection type liquid crystal display device 32 of the present invention. This drive could be achieved by the reflection layer which was featured by the low-drive voltage, the high transparency and the efficient color separation from the polymer stabilized phase transition type liquid crystal.

Moreover, the display quality was similar when the same light absorbing layer as that of Embodiment 8 was used in place of the solar cell. Moreover, the drive voltage was as low as 6 V, and the current to be consumed was 0.64 $\mu$A only for the light scattering mode display element. The CR2025 type lithium battery, as used, could give the wrist watch a battery lifetime of two years or longer.

Embodiment 11

With reference to FIG. 25, here will be sequentially described the manufacture of the reflection type liquid crystal display device of the present invention, which is constructed to include a light scattering mode display element 37, a hologram at the back of the display element 37 and acting as the hologram, and a light absorbing layer 5 at the back of the reflection layer 4.

The light scattering mode display element 37 was prepared by the same process as that of Embodiment 8.

The reflection layer 4 is exemplified in the present embodiment by the hologram. One example of this hologram is conceptionally shown in FIG. 29. At the back of a hologram forming layer 41, there may be arranged a reflection increasing layer 42. This reflection increasing layer 42 is made of a metal such as silver or aluminum, or its oxide. The reflectivity of the reflection increasing layer 42 is controlled with the thickness of the metallic film. The ratio of the metallic oxide between the reflection and the transmittance is controlled by thinning it into an interference film. In the present embodiment, the hologram forming layer 41 employed as its transmitting type holography diffraction grating the transmitting type diffraction grating film J52 and 116 of Edmond Scientific Japan Corporation. The reflection increasing layer 42 was exemplified by a dielectric mirror, as shown in FIG. 28, for transmitting the yellow and reflecting the blue.

The light absorbing layer was exemplified by the same one as that of Embodiment 8.

Figure 29:
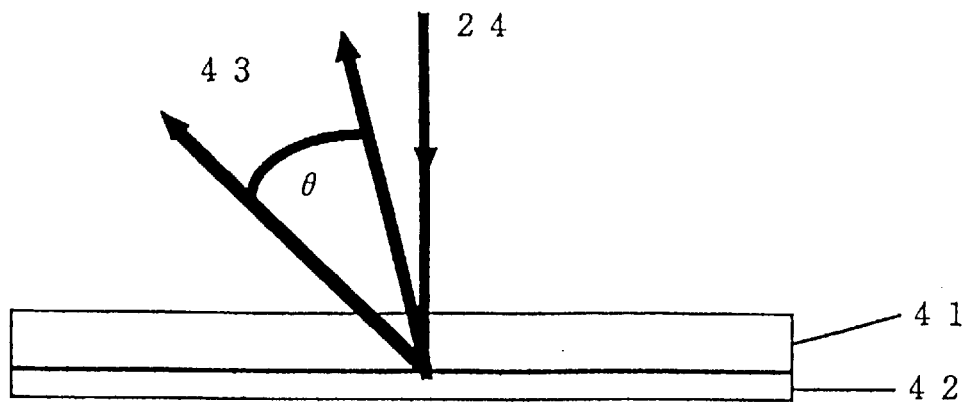
FIG. 29 is a conceptional diagram showing one example of a hologram layer of the present invention.

Then, the display appearances were evaluated under the illumination of a fluorescent lamp on the ceiling, by packaging it in a wrist watch. As a result, the time could be expressed in the black segment display on the bright blue background. Especially in the segment unit, the incident white light is diffracted out of the regularly reflecting direction, as shown in FIG. 29, by the action of the hologram so that it is divided into a diffracted light 43 at an angle $\theta$. As a result, the display is iridescent within the range $\theta$ but black outside of the range. Unlike the case without the hologram, therefore, the extreme reduction in the contrast, as might otherwise be caused by the regular reflection of the blue color in the blue background, can be improved. The colored background could provide the bright display having no dependency on the visual angle because of the intensive scattering properties featuring the polymer network liquid crystal. The display state was in the quality which could not be achieved by the light scattering liquid crystal of the prior art, thereby to enhance the value of the wrist watch as the ornaments or craftworks. By replacing the light absorbing layer by the solar cell, moreover, the power source, as composed of the solar cell of the reflection type liquid crystal display device, the reverse flow preventing diode 33, the voltage control circuit 28 and the secondary cell 35, could exclusively drive the watch driving IC and the liquid crystal display unit of the reflection type liquid crystal display device 32 of the present invention. This drive could be achieved by the reflection layer which was featured by the low-drive voltage, the high scattering properties and the efficient color separation from the polymer network liquid crystal.

Embodiment 12

Here will be described the reflection type liquid crystal display device of the present invention, in which the hologram of the reflection layer 4 in the construction of Embodiment 11 uses the dot pattern of FIG. 30.

The reflection layer 4 was exemplified by the grating image hologram. This grating image hologram is composed of square dots, as shown at (b) in FIG. 25. The dots have a size of 0.1 mm. The fringes of the hologram, as formed on the dots, can be adjusted in the diffraction direction by the fringe direction $\theta$ and the fringe pitch P. The diffraction angle can also be adjusted with a blazed angle by blazing the fringes. In the present embodiment 12, the diffraction direction was designed at random. This hologram may be generally called the "random dot hologram". This hologram is made by applying a resist to the substrate and by irradiating parallel laser beams for each dot unit in two directions in accordance with the pitch of the interference fringes. After the development and drying treatment, the ion etching was performed according to the blazing angle to expose and record the relief corrugations directly. Thus, an original (or resist hologram) was prepared. From now on, the reflection type liquid crystal display device was manufactured by the same process as the emboss hologram transferring process.

Then, the display appearances were evaluated under the illumination of a fluorescent lamp on the ceiling, by packaging it in a wrist watch. As a result, the numerous dots were confirmed to light brightly in the segments. These dots light brightly while changing their hues to the change in the visual angles. The bright lights were homogeneously achieved within a range of plus/minus 40 degrees with respect to the front of the wrist watch. The display state was like opal or a natural precious stone so that it could enhance the value of the wrist watch as the ornaments or craftworks. By replacing the light absorbing layer by the solar cell, moreover, the power source, as composed of the solar cell of the reflection type liquid crystal display device, the reverse flow preventing diode 33, the voltage control circuit 28 and the secondary cell 35, could exclusively drive the watch driving IC and the liquid crystal display unit of the reflection type liquid crystal display device 32 of the present invention. This drive could be achieved by the reflection layer which was featured by the low-drive voltage, the high scattering properties and the efficient color separation from the polymer network liquid crystal.

Embodiment 13

Here will be described the reflection type liquid crystal display device of the present invention, which is constructed of a light scattering mode display element 37 identical to that of Embodiment 10, a stereo-phase reflection hologram as the reflection layer 4 at the back of the display element 37, and a light absorbing layer 5 at the back of the reflection hologram. The hologram as the reflection layer 4 was exemplified by the Lippmann hologram for reconstructing a stereoscopic image of an object such as a living creature or a craftwork.

Then, the display appearances were evaluated under the illumination of a fluorescent lamp on the ceiling, by packaging it in a wrist watch. As a result, an object such as a living creature or a craftwork could be clearly reconstructed with the segments in the blue diffuse color on the cyan background. The stereoscopic creature or craftwerk can be enjoyed for the change in the visual angle in the transverse direction. Thus, a new value as ornaments or craftworks could be given to the digital wrist watch of the prior art. Moreover, the drive voltage was as low as 6 V, and the current to be consumed was 0.64 $\mu$A only for the light scattering mode display element. The CR2025 type lithium battery, as used, could give the wrist watch a battery lifetime of two years or longer. By replacing the light absorbing layer by the solar cell, moreover, the power source, as composed of the solar cell of the reflection type liquid crystal display device, the reverse flow preventing diode 33, the voltage control circuit 28 and the secondary cell 35, could exclusively drive the watch driving IC and the liquid crystal display unit of the reflection type liquid crystal display device 32 of the present invention.

According to the reflection type liquid crystal display device of the present invention, the following effects can be attained by setting the transmittance of the liquid crystal to 60% or more and the reflectivity of the reflection layer within a range of 10 to 50%. These effects are prominent especially in combination with the polymer network liquid crystal.

(1) Even with the cell gap for which the transmittance of the light scattering liquid crystal layer is 60% or more, it is possible to provide a reflection type liquid crystal display device which can make the black-and-white display with a low-voltage drive.

(2) Even for the scattering type liquid crystal cell in which the transmittance of the light scattering type liquid crystal layer is 60% or more to lower the backward scattering percentage, the white level for no voltage application (OFF) can be improved by arranging a reflection layer of 10 to 50% at the back of the liquid crystal layer.

(3) The poor visibility can be improved by setting the regular reflectivity from the mirror face of the reflection layer to 50% or less at the voltage application (ON) of the light scattering type liquid crystal layer.

(4) A highly visible liquid crystal device having no double reflection but a low cost can be provided by using the reflection layer commonly as one drive electrode.

As described hereinbefore, it is possible to provide a black-and-white display liquid crystal panel which is brighter and more visible than the prior art if applied to a watch or the like, and to make an effective contribution to the watch design. If applied to a mobile information device or the like, the liquid crystal panel improves the brightness and the visibility to allow a longer observation.

According to the present invention, the drop in the power generating efficiency of the photo-voltaic effect layer and the drop in the display quality of the liquid crystal layer can be reduced together by placing a photo-voltaic layer at the back of the highly transparent liquid crystal layer, as has been described hereinbefore. It is possible, although could not be realized by the system using the polarizing plate of the TN or STN mode, to realize the integration of laminating the LCD and the solar cell and the excellent display quality.

It is further possible, although could not be realized in the prior art, to provide a high photo-voltaic capacity and an ability of displaying a unique hue excellent in brightness and beautiful potential. The present invention can be effectively applied to displays for watches or other mobile electronic devices or to ornaments.

What is claimed is:

1. A reflection type liquid crystal display device comprising:

a pair of substrates having electrodes;

a light scattering type liquid crystal layer interposed between the substrates, the light scattering type liquid crystal layer being changeable between a scattering state or a transparent state in accordance with a change in a voltage level between the electrodes, and the light scattering type liquid crystal layer transmitting 60% or more of incident light irrespective of the change in the voltage level between the electrodes;

a reflection layer disposed over a rear surface of the light scattering type liquid crystal layer, the reflection layer having a reflectivity within a range of 10 to 50% for reflecting a forward scattered light passed through the light scattering type liquid crystal layer, the reflection layer containing at least one metal selected from the group consisting of aluminum, silver, nickel, chromium, palladium and rhodium, its alloy or its oxide, the metal, its alloy or its oxide of the reflection layer having fine pores so that the reflectivity of the reflection layer is controlled by the quantity of fine pores; and a light absorbing layer disposed over a rear surface of the reflection layer for absorbing light passed through the reflection layer.

2. A reflection type liquid crystal display device comprising:

a pair of substrates having electrodes;

a light scattering type liquid crystal layer interposed between the substrates and changeable between a scattering state or a transparent state in accordance with a change in a voltage level between the electrodes and operable to transmit 50% or more of incident light irrespective of the change in the voltage level between the electrodes;

a reflection layer disposed over a rear surface of the light scattering type liquid crystal layer, the reflection layer having a reflectivity of 5% to 50% while having low absorption in the visible region, and the reflection layer transmitting most of the light in the remaining visible region and in the near-infrared region; and a solar cell disposed over a rear surface of the reflection layer for receiving the incident light transmitted by the light scattering type liquid crystal layer.

3. A reflection type liquid crystal display device according to claim 2; further comprising an optical guide plate disposed over a surface of the solar cell which receives the incident light.

4. A reflection type liquid crystal display device according to claim 3; wherein the optical guide plate contains a fluorescent substance.

5. A reflection type liquid crystal display device comprising:

a pair of substrates having electrodes;

a light scattering type liquid crystal layer interposed between the substrates, the light scattering type liquid crystal layer being changeable between a scattering state or a transparent state in accordance with a change in a voltage level between the electrodes, and the light scattering type liquid crystal layer transmitting 50% or more of incident light irrespective of the change in the voltage level between the electrodes;

a reflection layer disposed over a rear surface of the light scattering type liquid crystal layer for reflecting a specific color in the visible light region and transmitting most of the light in the remaining visible region and in the near-infrared region; and a solar cell disposed over a rear surface of the reflection layer for receiving the incident light transmitted by the light: scattering type liquid crystal layer.

6. A reflection type liquid crystal display device according to claim 5; further comprising an optical guide plate disposed over a surface of the solar cell which receives the incident light.

7. A reflection type liquid crystal display device according to claim 6; wherein the optical guide plate contains a fluorescent substance.

8. A reflection type liquid crystal display device comprising:

a pair of substrates having electrodes;

a light scattering type liquid crystal layer interposed between the substrates, the light scattering type liquid crystal layer being changeable between a state exhibiting an absorption to a specific wavelength range in a visible region and a transparent or substantially transparent state in accordance with a change in the voltage level between the electrodes, and the light scattering type liquid crystal layer transmitting 50% or more of incident light;

a reflection layer disposed at a rear surface of the light scattering type liquid crystal layer, the reflection layer having a reflectivity of 20% to 70% within the visible region and transmitting most of the light in the remaining visible region and in the near-infrared region; and a solar cell disposed over a rear surface of the reflection layer for receiving the incident light transmitted by the light scattering type liquid crystal layer.

9. A reflection type liquid crystal display device according to claim 8; further comprising an optical guide plate disposed over a surface of the solar cell which receives the incident light.

10. A reflection type liquid crystal display device according to claim 9; wherein the optical guide plate contains a fluorescent substance.

11. A reflection type liquid crystal display device comprising:

a pair of substrates having electrodes;

a light scattering type liquid crystal layer interposed between the substrates, the light scattering type liquid crystal layer being changeable between a state exhibiting Bragg reflection to a specific wavelength range in the visible region and a transparent or substantially transparent state in accordance with the change in a voltage level between the electrodes, and the light scattering type liquid crystal layer transmitting 50% or more of incident light; and a solar cell disposed over a rear surface of the light scattering type liquid crystal layer for receiving the incident light transmitted by the light scattering type liquid crystal layer.

12. A reflection type liquid crystal display device according to claim 11; further comprising an optical guide plate disposed over a surface of the solar cell which receives the incident light.

13. A reflection type liquid crystal display device according to claim 12; wherein the optical guide plate contains a fluorescent substance.

* * * * *